US009828737B2

(12) United States Patent
Kruse

(10) Patent No.: US 9,828,737 B2
(45) Date of Patent: Nov. 28, 2017

(54) LUBRICATED SOIL MIXING SYSTEMS AND METHODS

(71) Applicant: Darin R. Kruse, Simi Valley, CA (US)

(72) Inventor: Darin R. Kruse, Simi Valley, CA (US)

( * ) Notice: Subject to any disclaimer, the term of this patent is extended or adjusted under 35 U.S.C. 154(b) by 41 days.

(21) Appl. No.: 14/738,705

(22) Filed: Jun. 12, 2015

(65) Prior Publication Data

US 2015/0275454 A1 Oct. 1, 2015

Related U.S. Application Data

(63) Continuation of application No. 13/487,010, filed on Jun. 1, 2012, now Pat. No. 9,085,872.

(60) Provisional application No. 61/493,307, filed on Jun. 3, 2011.

(51) Int. Cl.
| | |
|---|---|
| *B09C 1/00* | (2006.01) |
| *E02D 3/00* | (2006.01) |
| *E02F 3/20* | (2006.01) |
| *E02F 5/16* | (2006.01) |
| *E02F 5/30* | (2006.01) |
| *E02D 3/12* | (2006.01) |
| *E02D 17/13* | (2006.01) |
| *E02F 3/06* | (2006.01) |
| *E02F 3/08* | (2006.01) |
| *E02F 3/10* | (2006.01) |
| *E02F 5/10* | (2006.01) |

(52) U.S. Cl.
CPC ............... *E02D 3/005* (2013.01); *B09C 1/00* (2013.01); *E02D 3/126* (2013.01); *E02D 17/13* (2013.01); *E02F 3/06* (2013.01); *E02F 3/086* (2013.01); *E02F 3/10* (2013.01); *E02F 3/205* (2013.01); *E02F 5/10* (2013.01); *E02F 5/16* (2013.01); *E02F 5/30* (2013.01)

(58) Field of Classification Search
CPC ........................................................ B09C 1/00
See application file for complete search history.

(56) References Cited

U.S. PATENT DOCUMENTS

| | | |
|---|---|---|
| 880,597 A | 3/1908 | Syze |
| 924,153 A | 6/1909 | Elliott |
| 1,003,140 A | 9/1911 | Lardy |
| 1,004,288 A | 9/1911 | McAlpine |
| 1,089,573 A | 3/1914 | Morlae |
| 1,275,874 A | 8/1918 | Dowell |
| 1,866,242 A | 7/1932 | Warner et al. |

(Continued)

FOREIGN PATENT DOCUMENTS

| | | |
|---|---|---|
| DE | 2701380 | 7/1978 |
| DE | 19803074 | 8/1999 |

(Continued)

OTHER PUBLICATIONS

Supplementary European Search Report dated Mar. 30, 2015 for European Application No. 12793840.
U.S. Appl. No. 15/089,267, filed Apr. 1, 2016.

*Primary Examiner* — John Kreck
(74) *Attorney, Agent, or Firm* — K&L Gates LLP; Louis C. Cullman; Brian J. Novak

(57) ABSTRACT

Described herein are tools, systems and methods for conditioning, strengthening and/or improving in situ soil geotechnical or agricultural properties while at least temporarily reducing soil density, energy requirements, and tool wear.

17 Claims, 14 Drawing Sheets

(56) References Cited

U.S. PATENT DOCUMENTS

| | | | |
|---|---|---|---|
| 1,889,563 A | 11/1932 | O'Rourke |
| 1,976,628 A | 10/1934 | O'Rourke |
| 2,158,943 A | 5/1939 | Mamula |
| 2,624,193 A | 1/1953 | Larson |
| 2,734,343 A | 2/1956 | Asketh |
| 3,184,893 A | 5/1965 | Booth |
| 3,292,377 A | 12/1966 | Sanger |
| 3,293,865 A | 12/1966 | Loofbourow et al. |
| 3,355,849 A | 12/1967 | Lee |
| 3,516,256 A | 6/1970 | Itami et al. |
| 3,695,044 A | 10/1972 | Hoshino et al. |
| 3,804,260 A | 4/1974 | Crowley |
| 3,854,265 A | 12/1974 | Kobayashi et al. |
| 3,871,183 A | 3/1975 | Cardwell et al. |
| 4,015,383 A | 4/1977 | Crowley |
| 4,050,254 A | 9/1977 | Meheen et al. |
| 4,056,937 A | 11/1977 | Suzuki |
| 4,075,801 A | 2/1978 | Alper et al. |
| 4,178,110 A | 12/1979 | Cobbs |
| 4,205,949 A | 6/1980 | Hanson |
| 4,207,716 A | 6/1980 | Moldrup |
| 4,241,762 A | 12/1980 | Link et al. |
| 4,254,994 A | 3/1981 | McBride |
| 4,270,876 A | 6/1981 | Eklund et al. |
| 4,324,081 A | 4/1982 | Chicha |
| 4,401,397 A | 8/1983 | Sommer et al. |
| 4,423,981 A | 1/1984 | Nilberg |
| 4,460,293 A | 7/1984 | Richardson et al. |
| 4,473,322 A | 9/1984 | Echols et al. |
| 4,537,001 A | 8/1985 | Uppstrom |
| 4,812,084 A | 3/1989 | Wagner et al. |
| 4,830,536 A | 5/1989 | Birch et al. |
| 4,913,586 A * | 4/1990 | Gabbita | B09C 1/00 |
| | | | 210/728 |
| 5,118,230 A | 6/1992 | Justice |
| 5,141,366 A | 8/1992 | Ishida |
| 5,184,916 A * | 2/1993 | Thoer | E01H 12/00 |
| | | | 171/117 |
| 5,242,246 A * | 9/1993 | Manchak, III | B09C 1/00 |
| | | | 110/346 |
| 5,261,766 A | 11/1993 | Anderson |
| 5,332,334 A | 7/1994 | Wagner et al. |
| 5,346,332 A | 9/1994 | Wagner et al. |
| 5,474,399 A | 12/1995 | Chia-Hsiung |
| 5,522,676 A | 6/1996 | Gryba |
| 5,560,172 A | 10/1996 | Brophy et al. |
| 5,590,497 A | 1/1997 | Moore |
| 5,631,160 A | 5/1997 | Bruso |
| 5,639,182 A | 6/1997 | Paris |
| 5,808,052 A | 9/1998 | Szablikowski et al. |
| 5,814,147 A | 9/1998 | Tallard |
| 5,888,023 A | 3/1999 | Grabe et al. |
| 5,944,453 A | 8/1999 | Gryba |
| 5,967,701 A | 10/1999 | Berkley et al. |
| 6,149,352 A | 11/2000 | MacDonald |
| 6,220,789 B1 | 4/2001 | White |
| 6,328,501 B1 | 12/2001 | Gimbert |
| 6,431,798 B1 | 8/2002 | Magliocco |
| 6,485,234 B2 | 11/2002 | Johnson |
| 6,543,963 B2 | 4/2003 | Bruso |
| 6,802,673 B1 | 10/2004 | Ellenberger |
| 7,363,733 B2 | 4/2008 | Stoetzer |
| 7,604,301 B1 | 10/2009 | Lang |
| 7,722,293 B2 | 5/2010 | Kruse |
| 8,176,702 B2 | 5/2012 | Adam |
| 8,322,949 B2 | 12/2012 | Kruse |
| 2002/0012572 A1 | 1/2002 | Bruso |
| 2007/0264087 A1 | 11/2007 | Schmitt |
| 2008/0008534 A1 | 1/2008 | Ille et al. |
| 2009/0191003 A1 | 7/2009 | Kruse |
| 2011/0089745 A1 | 4/2011 | Reinhardt |
| 2012/0301224 A1 | 11/2012 | Peters |
| 2012/0308306 A1 | 12/2012 | Kruse |
| 2013/0078040 A1 | 3/2013 | Kruse |
| 2013/0255112 A1 | 10/2013 | Kruse |
| 2014/0227038 A1 | 8/2014 | Kruse |
| 2016/0215472 A1 | 7/2016 | Kruse |

FOREIGN PATENT DOCUMENTS

| | | |
|---|---|---|
| EP | 2039881 A1 | 3/2009 |
| EP | 2278075 A1 | 1/2011 |
| GB | 594708 | 11/1947 |
| GB | 750102 A | 6/1956 |
| GB | 1292638 A | 10/1972 |
| GB | 1348765 A | 3/1974 |
| GB | 1508040 A | 4/1978 |
| GB | 2026064 A | 1/1980 |
| GB | 2100772 A | 1/1983 |
| JP | H0819828 B2 | 2/1996 |
| JP | H09-296462 A | 11/1997 |
| JP | 10-195911 A | 7/1998 |
| JP | 11081299 A * | 3/1999 |
| JP | 2000017651 A | 1/2000 |
| JP | 2010261202 A | 11/2010 |
| WO | 99/18330 A1 | 4/1999 |
| WO | 01/46526 | 6/2001 |
| WO | 01/92647 A1 | 12/2001 |
| WO | 2005/052318 | 6/2005 |
| WO | 2009/097355 | 8/2009 |
| WO | 2009/136810 A1 | 11/2009 |
| WO | 2012/167170 | 12/2012 |

\* cited by examiner

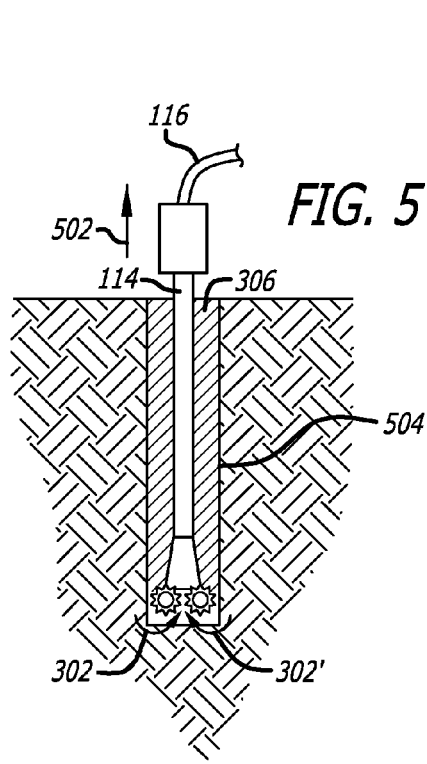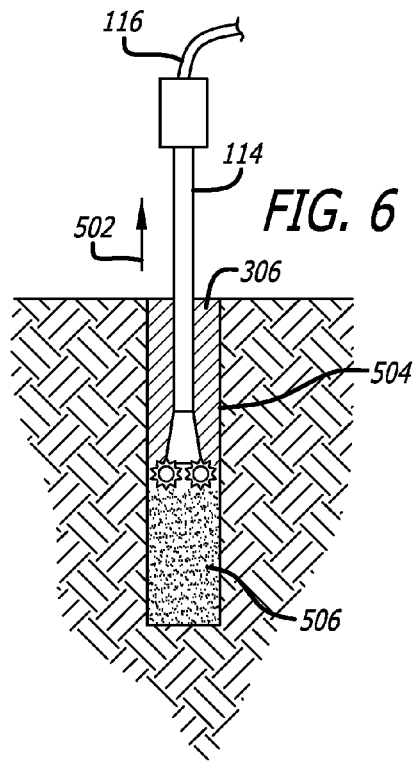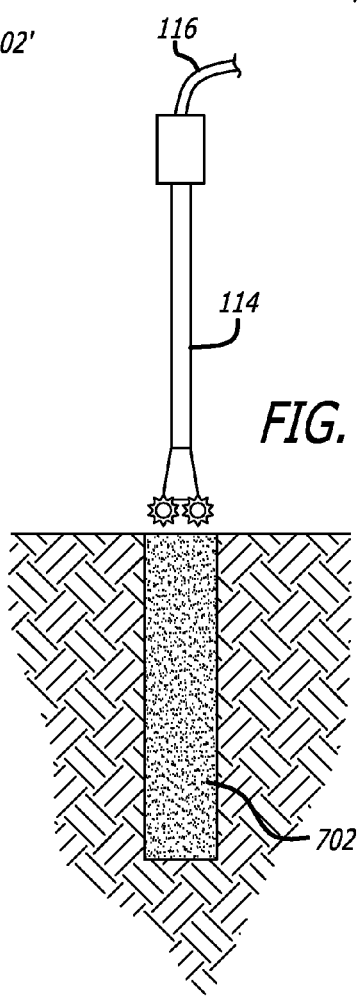

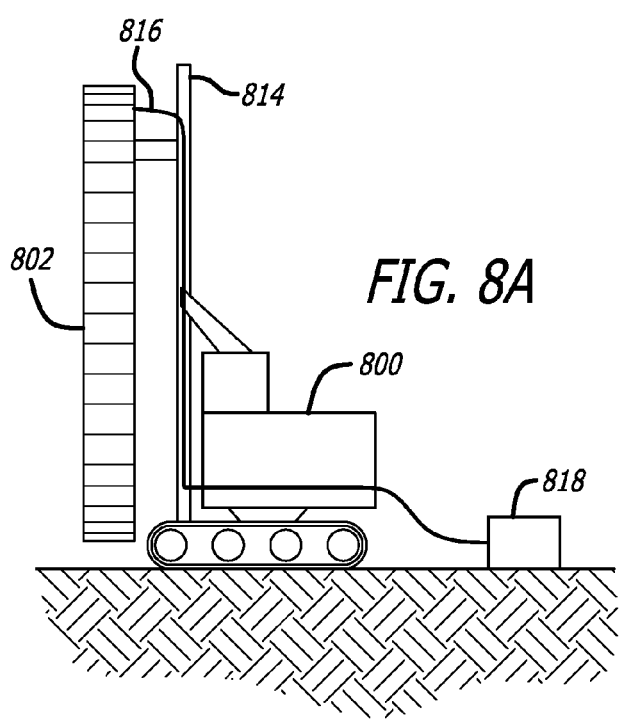
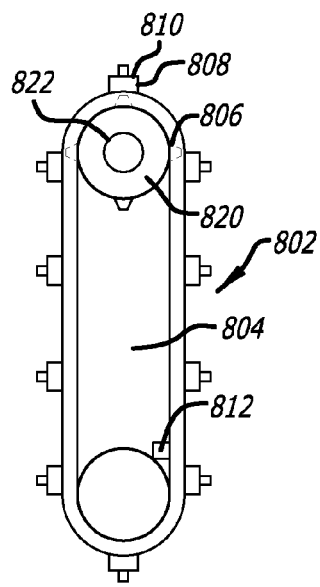
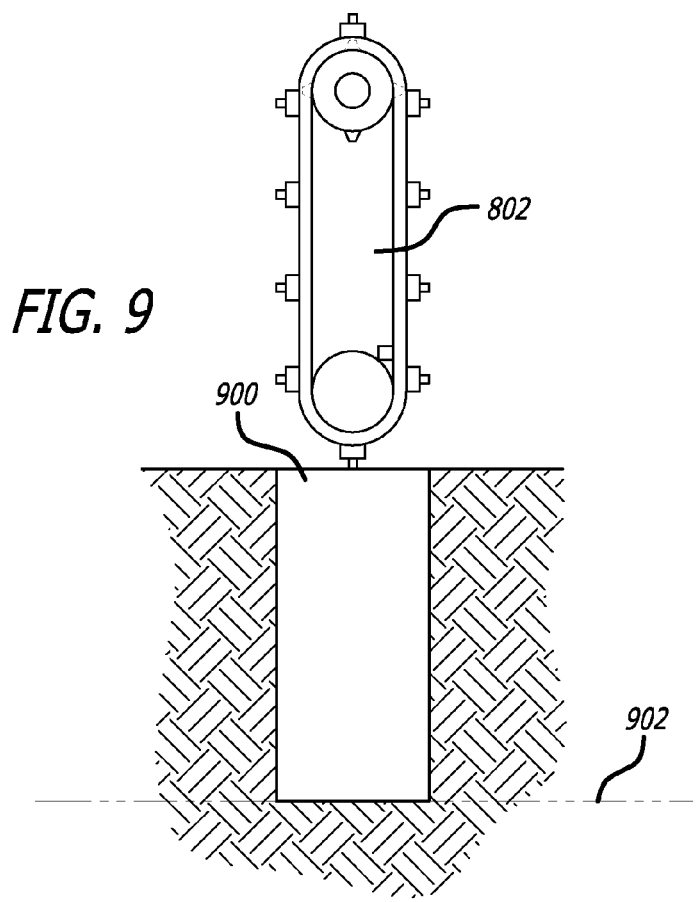

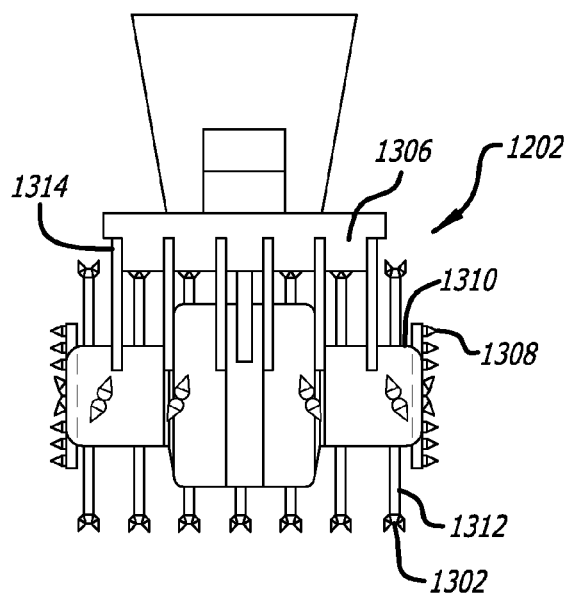
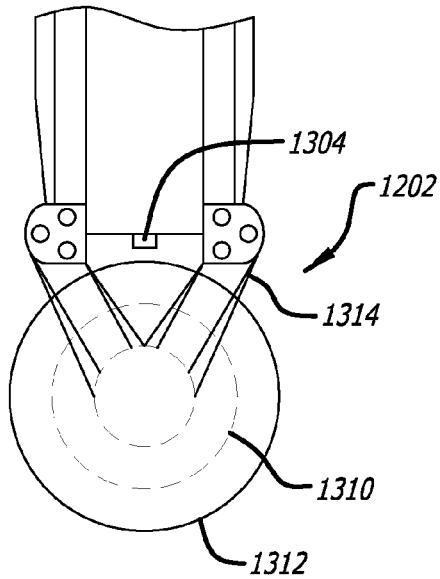
FIG. 13A  FIG. 13B
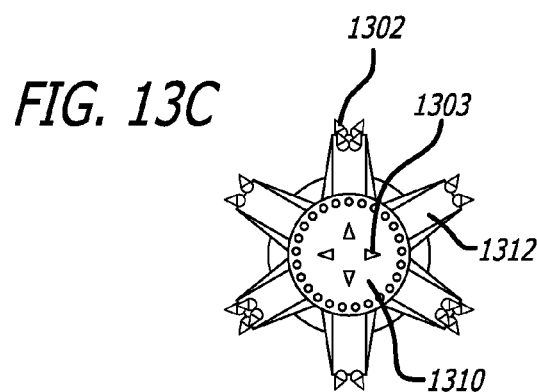
FIG. 13C

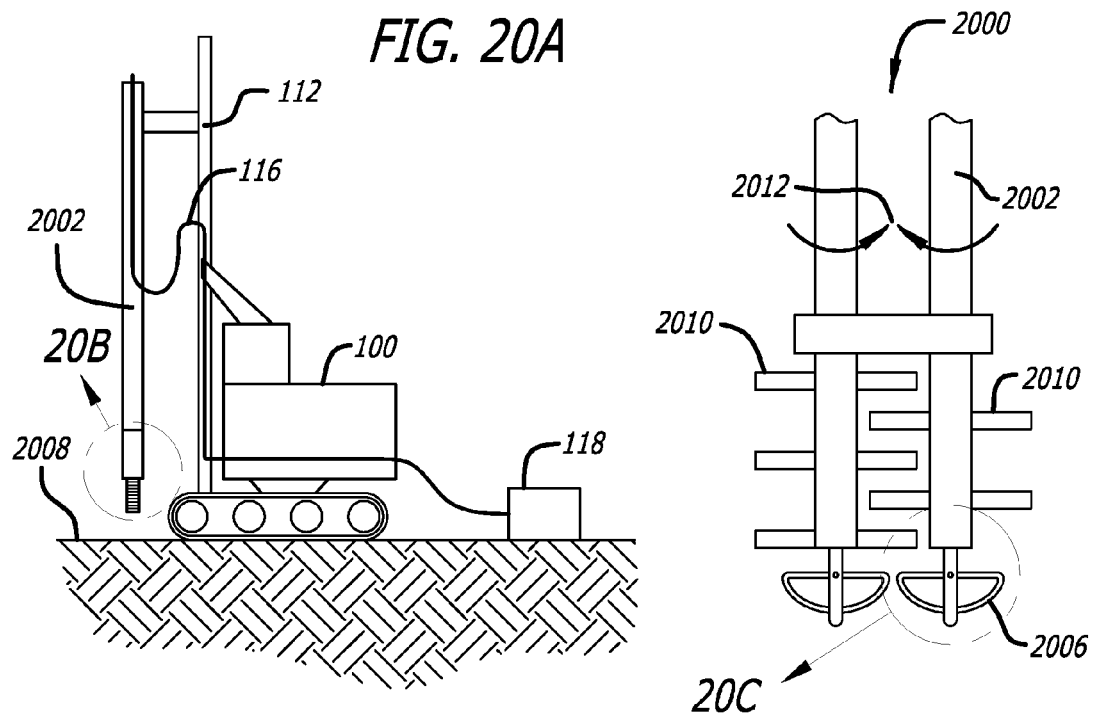
*FIG. 20A*
*FIG. 20B*
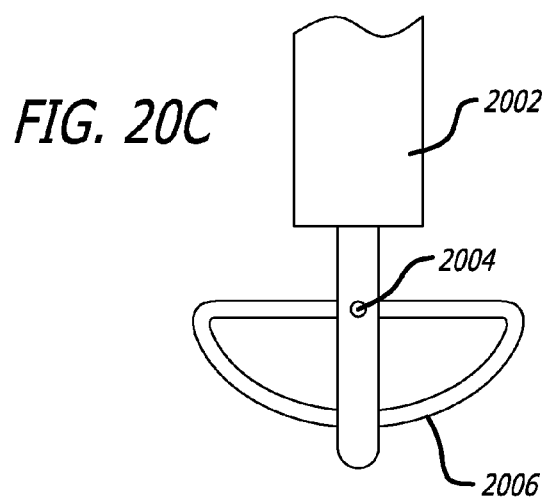
*FIG. 20C*

LUBRICATED SOIL MIXING SYSTEMS AND METHODS

CROSS REFERENCE TO RELATED APPLICATIONS

This application is a continuation of U.S. patent application Ser. No. 13/487,010, filed Jun. 1, 2012, which claims the benefit of U.S. provisional patent application No. 61/493,307, filed Jun. 3, 2011, the entire disclosures each of which are incorporated herein by reference.

FIELD

The present description relates to systems for improving soil by: mixing, conditioning, and/or strengthening soil.

BACKGROUND

Current technologies used to achieve deep soil mixing or deep mixing methods (DMM) can be categorized into vertical axis rotation, horizontal axis cutting wheels, and vertical continuous trenching. Advantages of these methods include low vibration, applicability to most soil conditions, good productivities (as high as 2,000/3000 sf/shift), and moderate unit pricing. However, these methods also have disadvantages including large and heavy equipment requirements, high mobilization costs, significant ground engaging tool wear and costs, shallow depths, and methods that are sensitive to very dense or stiff soils, organics, and boulders.

In general, DMM equipment advances a tool into the ground and mixes the soil. These processes are aided by a number of techniques including introduction of dry binders, high pressure water jetting, addition of compressed air, and injection of bentonite, cement, or combined bentonite-cement slurries. These techniques in conjunction with introduction of mechanical energy are intended to change the composition of the soil to achieve engineered geotechnical objectives.

However, current technologies waste energy, time and money.

SUMMARY

Described herein generally are systems for improving in situ soil's geotechnical or agricultural properties by: conditioning, mixing, strengthening, while at least temporarily reducing the soil's density comprising various DMM equipment, soil mixing tools, at least one tool advance additive (TAA) including an industrial lubricating foam, polymer, anti-clay anti-clogging agent or a combination thereof, at least one colloidal system comprising phyllosilicates, granulated ground blast furnace slag, cement or a combination thereof and/or at least one soil amendment or enhancing element, or a combination of all three. In some embodiments, the TAA can further include at least one soil enhancing element. The soil conditioning and/or improvement, generally, is accomplished in either a vertical column, shaft, or in situ horizontally constructed continuous wall. In other embodiments, the soil conditioning and/or improvement can also be realized when improving a near surface soil blocks or strata required for agriculture, or when cutting a soil face, or when trenching, tunneling, or any other situation where soil conditioning may be needed.

In one embodiment, the soil mixing tool can comprise at least one drilling tool, cutting wheel, bit, cutting blade, tooth, chain, drum, or a combination thereof. In another embodiment, the soil mixing tool can include multiple drilling tools, cutting wheels, bits, cutting blades, teeth, chains, drums, or a combination thereof. Further, a soil mixing tool can comprise at least one nozzle, for example to dispense one or more TAAs.

Also described herein are methods for creating a bound and/or impervious column and/or wall, in some cases continuous, comprising demoulding soil using a soil mixing tool while concurrently ejecting at least one tool advance additive from at least one nozzle associated with the soil mixing tool into the soil and mixing the soil with the at least one tool advance additive thereby creating a improved soil column or trench. The methods can further comprise ground improvement during extraction or movement of the soil mixing tool while ejecting and mixing at least one binding or agricultural soil amendment material with the conditioned soil thereby creating improved or strengthened soil.

In one embodiment, the methods comprise engaging the soil mixing tool with the soil at the desired location; rotating at least one drilling tool, cutting wheel, chain, drum, or a combination thereof associated with the soil mixing tool thereby cutting the soil while concurrently ejecting at least one TAA (foam, polymer, anti-clay anti clogging agent or combination thereof) from at least one nozzle associated with the soil mixing tool into the soil and mixing the soil with the at least one TAA foam, polymer, anti-clay anti clogging agent, or combination thereof thereby creating conditioned soil; moving the soil mixing tool to a desired depth and stopping the ejection of at least one TAA and starting ejection of at least one colloidal system; extracting the soil mixing tool while ejecting and mixing colloidal system with the conditioned soil thereby creating bound or impermeable soil; and creating an impermeable or bound wall or column. The moving step and/or the extraction step can be performed at a constant rate.

In another embodiment, the soil demoulding and/or conditioning can be preformed in one operation while a second process transports the conditioned soil to the surface where additional constituents can be integrated (e.g., mixed). Then, reformulated (e.g., denser) soil mixture can be placed back in the trench/column displacing the lighter (e.g., less dense) conditioned soil forming a uniform and homogeneous engineered soil element.

Further, in other embodiments, the TAA may be at least one industrial soil conditioning foam, soil conditioning polymer, or anti-clay anti clogging agent, or a combination thereof. The colloidal system or binding material can be composed of at least one slurry and/or pulverulent containing: phyllosilicates such as sodium bentonite, granulated ground blast furnace slag, cement, or a combination thereof.

In another embodiment, systems for improving soil while temporarily reducing density are described comprising a carrier, a soil mixing tool having a chassis including two axels driving a revolving chain fitted with ground engaging blades and wear teeth, at least one tool advance additive, and at least one colloidal binding, agricultural soil amendment, or impermeable material system.

Further still, soil mixing tools are described comprising two motor driven axles including drums comprising soil modifying teeth, wherein the two motor driven axles are configured to drive chains including cutting blades; and at least one nozzle configured to expel at least one TAA.

Additional features and advantages are described herein, and will be apparent from the following Detailed Description and figures.

BRIEF DESCRIPTION OF THE DRAWINGS

FIG. 5 illustrates a front view of the soil mixing tool being reengaged to be extracted while ejecting impermeable or binding material into the conditioned soil.

FIG. 6 illustrates a front view of the soil mixing tool being extracted while ejecting impermeable or binding material into the conditioned soil.

FIG. 7 illustrates a front view of the soil mixing tool fully extracted from the column and the resulting impermeable or bound column.

FIG. 8A illustrates an exemplary TRD system according to the present disclosure. FIG. 8B is a close-up of an exemplary TRD soil mixing tool.

FIG. 9 illustrates a side view of the TRD soil mixing tool over a predrilled hole.

FIG. 13A illustrates a front view of a TRDC cutter head. FIG. 13 B illustrates a side view of the TRDC cutter head. FIG. 13 C illustrates an end view of the TRDC cutter head.

FIG. 17A is a perspective view of the tool. FIG. 17B is a side view of the tool with the connection point removed. FIG. 17C is a top view of the tool with the connection point removed.

FIG. 20A-C illustrate an exemplary vertical axis rotary system according to the present disclosure. FIG. 20A illustrates an overview of components. FIGS. 20B and 20C are close-up views of the drilling and mixing tool.

DETAILED DESCRIPTION

Figure 1:
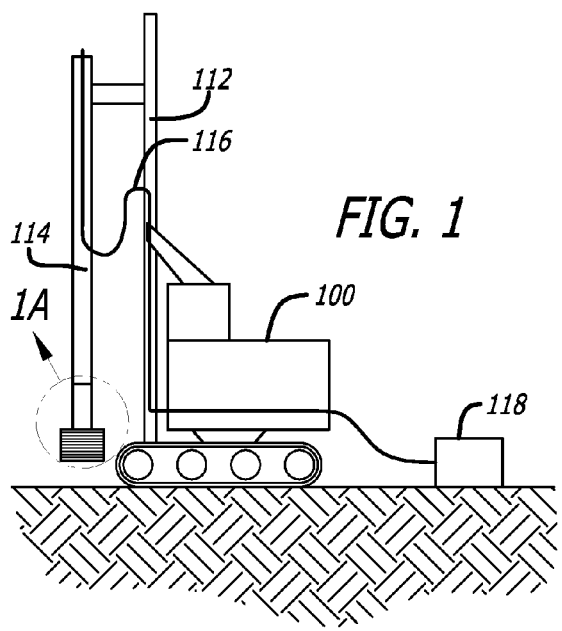
FIG. 1 illustrates an exemplary CSM system according to the present disclosure.

Described herein are tools, systems, apparatus, and methods for conditioning, mixing, strengthening, and/or improving in situ soil while at least temporarily reducing soil density, improving soil malleability and lubrication, decreasing equipment energy requirements, and/or improving tool life by decreasing tool wear. The systems generally include a carrier, drilling rig, or equivalent machinery; a soil mixing tool; and at least one TAA comprising an industrial foam, polymer, anti clogging agent, or a combination thereof, optionally at least one colloidal system comprising slurry, pulverulent containing phyllosilicates granulated ground blast furnace slag, cement or a combination thereof, optionally at least one soil amendment or enhancing element, or a combination of two or all three used to bind, nourish, condition, strengthen, or make impermeable the soil materials. In some embodiments, the TAA can further include at least one soil enhancing element such as a fertilizer.

Current DMMs methods utilize vertical axis rotary drilling equipment. Other technologies include horizontal axis cutting wheels known as cutter soil mixing (CSM), transverse rotary drum cutter tools or milling drums (TRDC), or vertical continuous chain trenching known as trench re-mixing and cutting deep wall method (TRD).

Technologies for vertical axis rotary soil mixing include a drill rig equipped with at least one rotary drill motor with various designed ground cutting tools positioned at the tip of the drill string. The shaft can also be equipped with staggered auger flights, blades, and/or paddles to increase the soil mixing energy. Dry or slurry materials, "binders", are injected into the hollow shaft to treat the in situ soil. Such technologies tend to be highly inefficient, wasteful and costly when compared to the equipment and methods described herein.

Technologies for CSM use a basic process starting with an application of mechanical energy in the form of two rotating cutter wheels fitted with ground engaging teeth that destruct the soil matrix and simultaneously add and mix binders into the soil as the tool advances into the ground.

Generally, the cutter head is attached to a kelly bar mounted on a tracked carrier and is driven into the ground at a continuous rate breaking up the soil and mixing slurry or pulverulent (wet or dry mixing) into the soil. The resultant reconstructed homogeneous soil-cement material can be engineered (based on binder constituents and soil characteristics) to: contain contaminates, reduce ground water conductivity, and strengthen the soil. Applications can include environmental remediation, cut-off or slurry walls, earth retaining walls, slope stability, liquefaction mitigation, and soil improvement for support of foundation elements.

Utilizing many DMM technologies, methods of mixing are dry or wet. Advantages of dry mixing can be faster soil mix time (smaller drilling-mixing ratio) and less binder requirements for a given strength resulting in lower material cost per unit. However, the disadvantages of this method include wear to teeth, drums, wheels, and seals, in some cases drastically raising the cost per unit. On the other hand, the wet method can reduce wear on the machine (lower tooth consumption, drum wear and longer motor seal replacement intervals), but can have a higher drilling-mixing ratio (20% higher than the dry method) requiring longer machine operating time per unit volume thereby raising the cost per unit per volume mixed. In both methods, major disadvantages may be the time required to demould and then mix the soil using in some instances one high horsepower machine, associated wear and tear on the cutting and mixing equipment, and the high power requirement (and prerequisite large machines) needed to demould the in situ soil.

Hydraulic TRDC's can use a spur-gear transmission, high-torque hydraulic motor and cutting drum equipped with picks or teeth. These tools (attachments) are typically powered by the existing hydraulic system of the carrier (excavator). Initially designed for rock cutting, scaling, concrete milling or demolition, tunnel profiling, stump grinding, transverse rotary tools have recently been adapted with various mixing blade and ground engaging tools equipped with optional wet or dry injection systems for soil mixing and blending.

With TRD, the post or bar on which a chain rides is cut into the ground or lowered into a pre-drilled hole and then advanced horizontally to construct a continuous wall. Various configurations of blades or teeth are attached to the chain according to soil composition. Slurries are injected at multiple vertically spaced points along the cutting surface of the chain to lubricate and mix the slurry in with the soil. As with all DMM, slurry mix designs can be engineered to maintain and support the trench, column, or shaft wall's stability during construction and achieve engineered geotechnical improvements to the in situ soil.

Most DDM technologies tend to waste energy, time and/or money. On the other hand, the tools, systems, and methods described herein can increase quality of in situ mixed soil properties, reduce soil density at least temporarily, increase soil malleability, lubricate the soil-tool interface, decrease clay sticking to the ground engaging tools, decrease heat generation, improve binder mixing efficiency, and/or reduce energy requirements equating to savings in energy, time, and tool wear. These advantages can result in bottom line savings.

Referring to FIG. 1, a CSM drill rig or carrier 100 or equivalent machinery can be any machine capable of supporting and driving the soil mixing tool described herein. Exemplary equipment can be manufactured by Bauer Maschinen GmbH, or Casagrande, ABI, Liebherr Group, and Cutter Soil Mixing and Processing Equipment manufactured by TEC Systems.

Figure 1A:
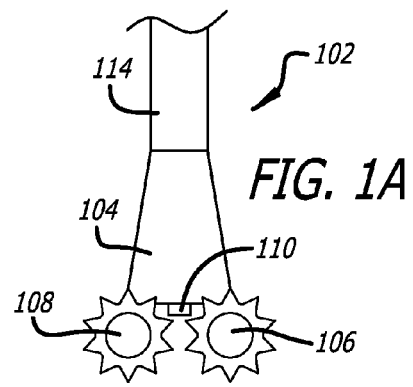
FIG. 1A is a close-up of an exemplary CSM soil mixing tool.

The soil mixing tool can have many different configurations depending on the soil conditions present at the construction site. Generally, however, soil mixing tool 102 has chassis 104 terminated with at least one cutting wheel 106. Any number of cutting wheels can be used. For example, in FIG. 1A, soil mixing tool 102 has cutting wheel 106 and second cutting wheel 108. In other embodiments, soil mixing tool 102 has three, four, five, six, seven, eight, nine, ten or more cutting wheels. Chassis 104 further includes at least one nozzle 110 situated between cutting wheel 106 and second cutting wheel 108. In other embodiments, nozzles can be placed at different locations on chassis 104 depending on the type of soil and/or the materials being delivered by each nozzle.

Soil mixing tool 102 may be attached to kelly bar 114 that is used to align and extend the tool into the soil. Kelly bar 114 can be attached to drilling rig 100 by mast 112. Electronics, TAA's, air, water and impermeable materials and binding materials can all be delivered to soil mixing tool 102 through line(s) 116. Work box 118 feeds line(s) 116 with materials mentioned. Work box 118 can be any separate piece or set of equipment to achieve a construction task. For example, work box 118 can include an air compressor, foam mixing and generating equipment, a cement processing assembly or a cement mixing and pumping system.

Figure 3:
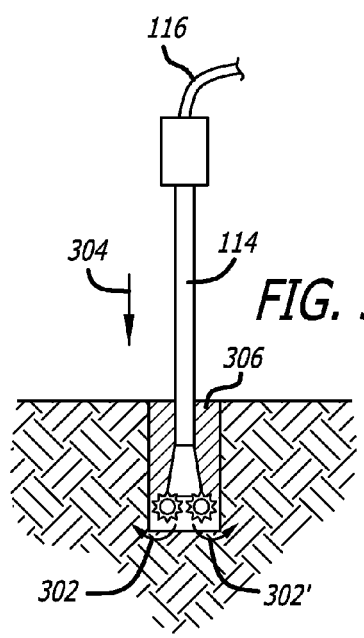
FIG. 3 illustrates a front view of the soil mixing tool cutting a column in the soil while ejecting TAA foam and conditioning the soil.
Figure 2:
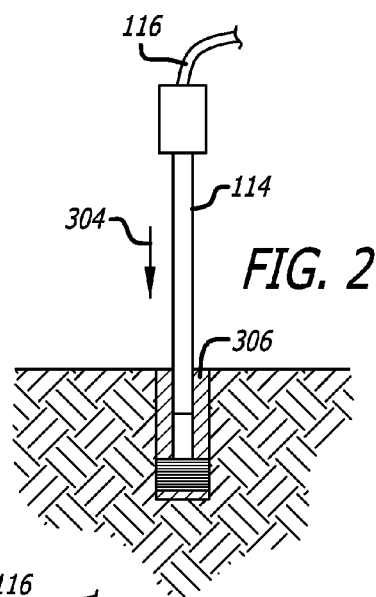
FIG. 2 illustrates a side view of the CSM soil mixing tool cutting a column in the soil.

Drilling rig 100 armed with soil mixing tool 102 can be used to create cut-off or slurry walls, earth retaining walls, liquefaction mitigation, and to achieve environmental remediation and soil improvement or bearing capacity for foundation elements. In one example, carrier 100 is moved into position above the location where soil mixing is to commence. Soil mixing tool 102 is then lowered into position just above the soil or in contact with the soil. At this point, at least one TAA is ejected through nozzle 110 onto the soil to be cut into. Referring now to FIGS. 2 and 3, once the topsoil is saturated with foam, cutting wheel 106 and second cutting wheel 108 are switched on and spin outward from one another as indicated by arrows 302, 302'.

In some embodiments, the foam may not be ejected from nozzle 110 until cutting wheel 106 and second cutting wheel 108 begin to cut the soil. In other words, in such embodiments, the soil is not conditioned prior to cutting into the soil.

In one embodiment, soil mixing tool 102 is preferably driven down 304 into the ground at a constant rate. However, the driving rate can be pulsated if needed for a particular soil type. As the soil is cut/mixed, TAA's are constantly added to the mixed soil thereby temporarily reducing the density, improving soil-cutting tool interface lubrication, and creating conditioned soil 306. As soil mixing tool 102 is lowered, the speed and direction of cutting wheel 106 and second cutting wheel 108 can be varied independently as determined by the operator or computer controller. In some embodiments, depending on the soil condition at the location, soil density surrounding the working area may be reduced permanently using the methods described herein.

Figure 4:
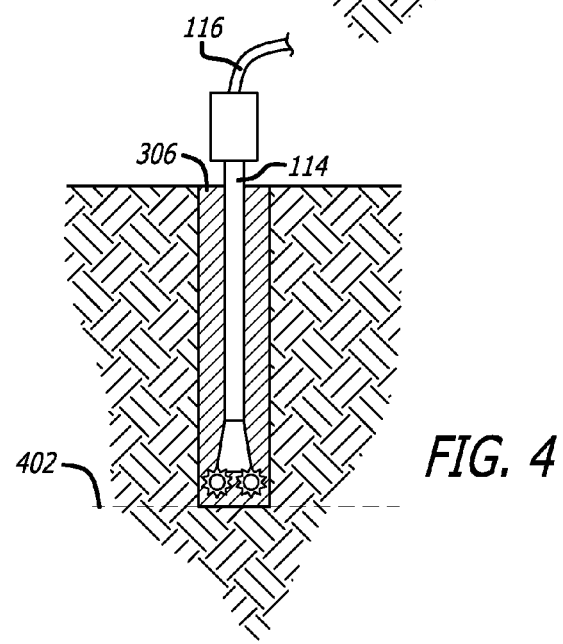
FIG. 4 illustrates a front view of the CSM soil mixing tool once it has reached the desired depth.

Referring to FIG. 4, once desired depth 402 has been reached, the TAA foam injection can be stopped and at least one colloidal system material can begin to pump through nozzle 110. Then, as illustrated in FIGS. 5 and 6, soil mixing tool 102 is extracted back up 502 conditioned column 504 slowly mixing at least one colloidal/binding material with the reduced density soil 306 thereby creating bound or improved soil 506. Finally, as illustrated in FIG. 7, once the top of improved/bound column is reached, the colloidal/binding material pumping can be stopped and the soil mixing tool can be extracted from the ground leaving a column of processed soil 702.

The entire rig can be moved laterally to an adjacent position to dig and process another column. In some embodiments, column construction patterns can alternately skip every other column in a sequence permitting mixed soil to strengthen over night. Then, the next days shift can excavate and mix intermediate columns. The prior day's columns can be partially cutt into or notched to assure contact, in some cases complete contact, between the columns to limit groundwater penetration through the wall or element. The processes can be repeated as many times as necessary until a desired column or trench length has been achieved. Different column, shaft, or trench pattern construction sequences are envisioned depending on the desired geotechnical or agricultural objectives and are dependent on other factors such as climate, in situ soil condition, height of the water table, desired final soil characteristics, and the like. For example, computer programs can be used to map out a pattern that can be most efficient under a given set of circumstances. Further, the rig can be moved transversely or wider cutter wheels installed to achieve a thicker processed column or trench.

In another embodiment, TAA's can be injected into the soil on both the way down the column (advance) and on the way back up the column. Then, in a second phase, subsequent day or shift depending on factors such as climate, in situ soil condition, height of the water table and the like, the soil mixing tool can be reinserted into the reduced density soil and impermeable/binding material can be pumped into the soil on the way down the column and on the way back up the column to improve geotechnical properties of the completed soil. In one embodiment, this method may be used when binder hydration time, or initial set time, may occur faster than the column excavation time effectively avoiding getting the tool stuck in the curing material.

In another embodiment, TAA's can be injected into the soil during a demoulding and density reduction phase leaving binder addition and mixing to a secondary phase. With this method, a second tool can transport the conditioned soil to a ground surface located batch plant wherein impermeable/binder materials may be added and mixed and then reinserted into the trench/column. The lighter (e.g., lower density) conditioned soil can be displaced and can rise to the top of the column/trench. In one embodiment, all processes (i.e. demoulding, soil conditioning, extraction, pulverulent or slurry mixing, reinjection and displacement) can operate concurrently providing a high quality uniform mixed soil.

In another embodiment, hydraulic TRDC equipped with modified drums, blades, picks or teeth and scraper plates including optional wet or dry injection systems which are attached to standard long reach excavators are being used for in situ soil mixing and improvement. Exemplary equipment is manufactured by Alpine, Sandvik, Boart Longyear, Terex/Schaeff, Antraquip, Allu, or Eickhoff.

In another embodiment, a tool can have one or more hydraulic powered parallel rotating chains with variable length drums attached to the ends of the drive axles forming the major components of an excavator mounted attachment. The chains and drums can include blades, picks or teeth and/or scraper plates and can include optional wet (slurry) or dry (pulverulent) injection systems. Additional conditioning foam and or high pressure water and air manifold and nozzle systems can supply various TAA's during the soil demoulding, conditioning, and/or mixing process.

In another embodiment, TRDC equipped with modified drums, blades, picks or teeth and scraper plates including optional wet or dry injection systems can act as standalone equipment. For example, rotary tillers, can be used with the methods of the present systems preferably without at least one colloidal system comprising slurry, pulverulent containing phyllosilic. In such embodiments, the TAA used with the standalone equipment can include, for example, an industrial foam, polymer, anti clogging agent, or a combination thereof that is conducive to future agricultural use of the modified soil. Such TAAs include at least one additive or can be a TAA that is conducive in and of itself.

It is within the scope of the present description that the standalone equipment can cut soil not conducive for agricultural use and through the use of the TAA both aerate the soil and/or implant it with nutrients, amendments, or both. For example, the foams and polymers used as TAA can be conjugated with, injected with, or otherwise associated with soil nutrient species. For example, fertilizer can be mixed with the foams and injected as described herein. In other embodiments, ionic nutrients can be associated with charged polymers or foams. Further still, nutrients can be covalently bound to polymers or foams prior to injection into the soil. Standard equipment, for example rotary tillers, can be modified to include injectors and a carrier for at least one TAA without disturbing the functionality or operation of the equipment.

The selection of at least one TAA can be dependent on such variables as the type of soil mixing tool used, the type of soil being mixed (or cut), the colloidal/binding material to be used in the extraction step, the desired or engineered "post mixed" soil objective, characteristic, design, or the like. In some embodiments, the foam can be an aqueous dispersion based on modified non-ionic surfactants, or the like, or a combination thereof. Lubricants and anti-clay agents can be an aqueous dispersion based non-ionic polymer and/or non-ionic surfactant. In one embodiment, the lubricants and anti-clay agents can be aqueous dispersions based non-ionic polymer. In another embodiment, the lubricants and anti-clay agents can be aqueous dispersions based non-ionic surfactants.

Biodegradable TAA's are available from various manufactures including BASF or Condat. For example, exemplary foaming agents can be CLB F4 (used on all types of soil), CLB F4/TM (used in permeable water saturated ground), CLB F4/M (used in permeable ground), CLB F4/L (used in impermeable ground containing clay), CLB F4/AD (used as an anti-dust for rock) by Condat Lubricants or a combination there of. Foams are an aqueous dispersion based on modified non-ionic polymers and/or non-ionic surfactants. In one embodiment, the foams can be aqueous dispersions based on modified non-ionic polymers. In another embodiment, the foams can be aqueous dispersions based on modified non-ionic surfactants.

For example, for mixing/cutting in fine sand, a mixture of CLB F4/TM and CLB F4/M can provide adequate lubrication. In coarse sand and gravel, a mixture of CLB F4 and CLB F4/TM can provide adequate lubrication. In chalk, a mixture of CLB F4/M and CLB F4/TM can provide adequate lubrication. In marl and clay, a mixture of CLB F4/L, CLB F4/M, and CLB F4/TM can provide adequate lubrication. In limestone, a mixture of CLB F4/M and CLB F4/TM can provide adequate lubrication. In rock, CLB F4/AD can provide adequate lubrication as well as prevent dust.

Other exemplary soil conditioning foams, polymer lubricating additives, and anti-clay agents include those manufactured by BASF. Anti-wear and anti dust agents such as, but not limited to, MEYCO ABR1, MEYCO ABR2, or MEYCO ABR5; Rheosoil anti-clay agents such as, but not limited to RHEOSOIL 143, RHEOSOIL 211 or PHEOSOIL 214; and Meyco SLF conditioning foams such as, but not limited to MEYCO SLF 10, MEYCO SLF 20, MEYCO SLF 30 or MEYCO SLF 41 can be used. Combinations of the above agents can also be used depending on the soil conditions. Typically composed of aqueous dispersion based non-ionic polymers and/or non-ionic surfactants.

The TAAs can have the advantages of lowering inner friction and abrasiveness of the soil. TAA's can reduce power requirements and lower wear costs. With cohesive soils, TAA's can break down the clay structure reducing stickiness which left unconditioned, results in clogged tool parts and slows soil mixing tool advance rates. TAA's can also improve plastic deformation properties in the soil, resulting in an even and controlled support pressure and trench wall stability. Some TAA formulas can also reduce permeability and increase sealing at the trench wall face. Further, special formulations for clay, for example, CLB F4/AD, can prohibit re-agglomeration of clay particles reducing adhesion effects on the tool itself.

The foams can be formulated for a wide range of soil types (cohesive and non-cohesive) and can be mixed with additional polymers to improve performance in high water content or poorly graded soil conditions where foam alone is inadequate. In cases of coarse, clean sands and gravels, the polymers can improve cohesion and provide a strong viscosifying effect, for example, turning wet soil into a more manageable consistency. One polymer can modify bentonite slurry improving the yield and filter cake properties of the slurry to aid in trench wall stability.

In some embodiments, the conditioned lower density mix of soil and TAA's can require less mixing time and energy to integrate the colloidal system which may be applied dry taking advantage of the best of both conditions; rapid sinking and mixing yet lower power requirement and tool wear by use of the TAA's during initial advance of the tool on its downward stroke.

At least one colloidal system or binder component of the described systems can be selected from a combination of, bentonite, cement, combined bentonite-cement slurries, phyllosilicates, granulated ground blast furnace slag, or combinations thereof. In some embodiments, the addition of at least one colloidal system or binder component is optional.

The use of at least one TAA such as a foam, lubricant, polymer, anti claying agent, or combination thereof on at least the initial sinking of the soil mixing tool is to achieve at least one of the following advantages over existing technologies. First, the foam, lubricant, polymer, anti claying agent, or combination thereof can provide lubrication of the ground and soil resulting in reduced cutter tool torque requirements. This reduction in torque can equate to lower overall system power requirements and less cost to run the system. Another advantage of ground and soil lubrication is reduced friction at the soil-ground engaging tool interface reducing wear of both the teeth themselves and the drums. Reduced tool wear means less frequent replacement and repair of the teeth and drums equating to cost savings and improved schedule performance. This lubrication can also reduce heat generation at the cutters. In one embodiment, the TAA is a foam-polymer-anti claying agent.

Another advantage of using at least one TAA is that the soil can become more homogenized (malleable) as the soil mixing tool is advanced into the ground. This in turn can cause uniform aeration of the ground thereby decreasing weight over the tool requiring less energy for the tool to work at depth. Soil malleability can also create a uniform soil state easing application of at least one colloidal system/ binder or agricultural soil amendment on the extraction of the soil mixing tool. The TAA foam-polymer-anti claying agent further can aid in decreasing the binder addition or agricultural soil amendment mixing time, thereby reducing overall machine time and cost per unit of soil mixed. The effectiveness of the binder material per unit volume can also be enhanced as a result of the application of foam, lubricant, polymer, anti claying agent, or combination thereof to the soil.

As a result of a possibility of varied composition of soil, in many locations, stratification of soil may include many soil types with wide ranging specific gravities of each particle type. Use of the lubricating foam can evenly suspend these various particles within the soil matrix promoting uniformity and higher overall mixed soil quality.

The application of TAA to the soil temporarily can reduce the density of the soil per unit volume. This decreased density can lead to effects such an improved advance rates (faster penetration) of the soil mixing tool into the ground to its final depth. Overall, the stability of the column may be enhanced because of the advantages outlined above. Another advantage of using at least one TAA is that the soil can remain in a lower density, homogenized (malleable) and/or lubricated state for multiple shifts permitting extended excavation time required for deeper soil mix elements or bifurcation of the work between a first phase comprised of demoulding and conditioning and a second phase comprising binder or soil amendment mixing.

A TAA can be modified by being conjugated with, injected with, mixed with or otherwise associated with at least one soil amendment or enhancing element. Soil enhancing elements can include soil nutrients (for example, fertilizer), antimicrobial agents, anti-molding agents, herbicides, pesticides, minerals, additives (for example, gypsum), metals, and the like. For example, as described, fertilizer can be mixed with the foams and injected. A skilled artisan can envision further soil amending or enhancing elements and methods of associating them with the present TAAs when armed with the present specification.

At least one agricultural soil amendment of the described system can be selected from two broad categories; organic and inorganic. Organic amendments include sphagnum, peat, wood chips, grass cuttings, straw, compost, manure, biosolids, sawdust, and wood ash. Inorganic amendments include vermiculite, perlite, tire chunks, lime, coal ash, pea gravel and sand. A soil amendment is any material added to a soil to improve its physical properties, such as water retention, permeability, water infiltration, drainage, aeration, and structure.

In another embodiment, as illustrated in FIG. 8, a TRD is illustrated. Carrier 800 or equivalent machinery can be any machine capable of supporting, powering, and driving the soil mixing tool described herein. Exemplary equipment can be manufactured by KG Machinery Co., Ltd, DeWind One Pass, or Mastenbroek in conjunction with Soletanche Bachy.

Soil mixing tool 802 can have many different configurations depending on the soil conditions present at the construction site. Generally, however, soil mixing tool 802 has sectional bar 804 circumferentially surrounded by revolving chain 806 fitted with ground engaging element holders 808 and wear teeth or parts 810. Bar 804 can further include at least one nozzle 812. In other embodiments, one or more nozzles can be placed at different locations on chassis 804 depending on the type of soil and/or the materials being delivered by each nozzle. For example, soil mixing tool 802 can include one, two, three, four, five, six, seven, eight, nine, ten, eleven, twelve, 13, 14, 15, 16, 17, 18, 19, 20, 21, 22, 23, 24, 25, 26, 27, 28, 29, 30, 31, 32, 33, 34, 35 or more nozzles. Chain 806 can be actuated by sprocket 820 which is powered by motor 822.

Soil mixing tool 802 can generally be attached to carrier 800 by mast attachment 814. Soil mixing tool 802 can be attached to mast attachment 814 that can be used to align and drive the tool through the soil. Electronics, TAA's, air, water and impermeable materials and binding materials can all be delivered to soil mixing tool 802 through line(s) 816. Work box 818 feeds line(s) 816 with materials mentioned. Work box 818 can essentially be any separate piece or set of equipment to achieve a construction task. For example, work box 818 can include an air compressor, one or more compressed air tanks, a generator(s), a high pressure water pump and or water storage tanks, a solar panel and batteries, foam mixing and generating equipment, foam, cement or bentonite-cement processing assembly, or a cement or bentonite-cement mixing and pumping system.

Figure 10:
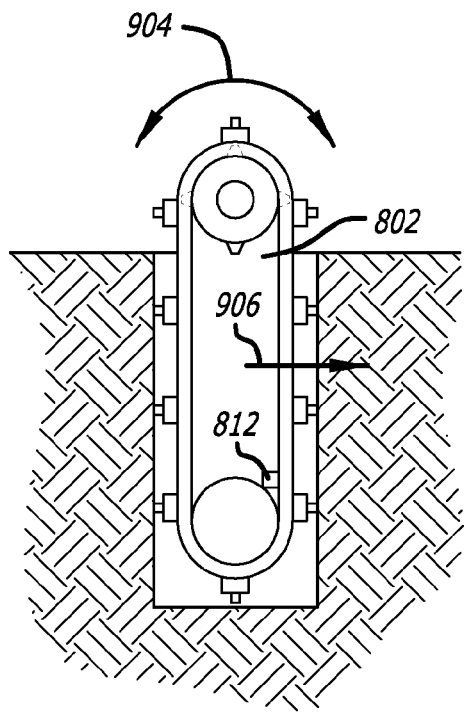
FIG. 10 illustrates a side view of the soil mixing tool cutting a wall in the soil.

In FIGS. 9 and 10, soil mixing tool 802 can be moved into position above a predrilled hole 900 bored to desired depth 902 where the soil mixing is to commence. Revolving chain 806 can be driven in a clockwise 904, or in some cases a counter clockwise direction, and the entire soil mixing tool can be advanced in direction 906. At this point, at least one TAA and a binding and/or impermeating material may be ejected through nozzle 812 or multiple nozzles into the soil to be cut into. Once saturated soil is achieved with foam, the soil mixing tool 802 can be advanced. Including the TAA's at the initial phase of soil demoulding, the soil characteristics can be favorably changed allowing easier cutting, conditioning, and mixing of binder and/or soil modifying or nutrient enhancing materials later in the mixing sequence.

Figure 11:
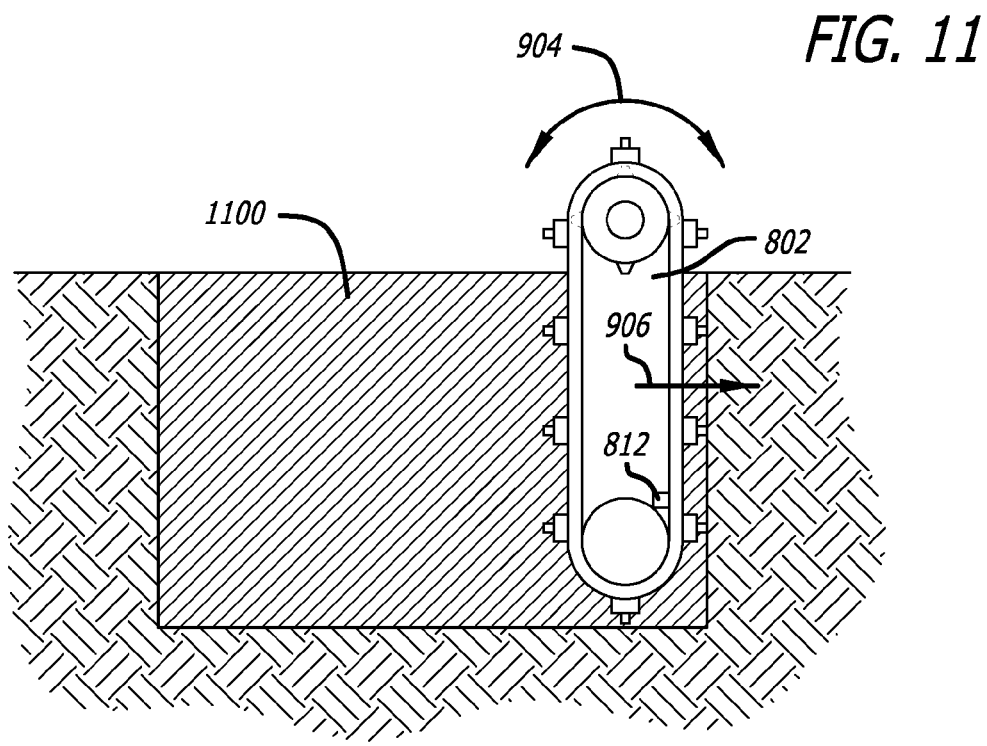
FIG. 11 illustrates a side view of the TRD soil mixing tool as it moves through the soil and creates the in situ mixed soil wall.

Referring to FIG. 11, as soil mixing tool 802 is advanced, behind it is created uniform conditioned, and/or bound/impermeable soil 1100. Using this method, a continuous wall can be created with virtually no seams or stratification. When the desired length has been achieved, soil mixing tool 802 can be removed.

Figure 12:
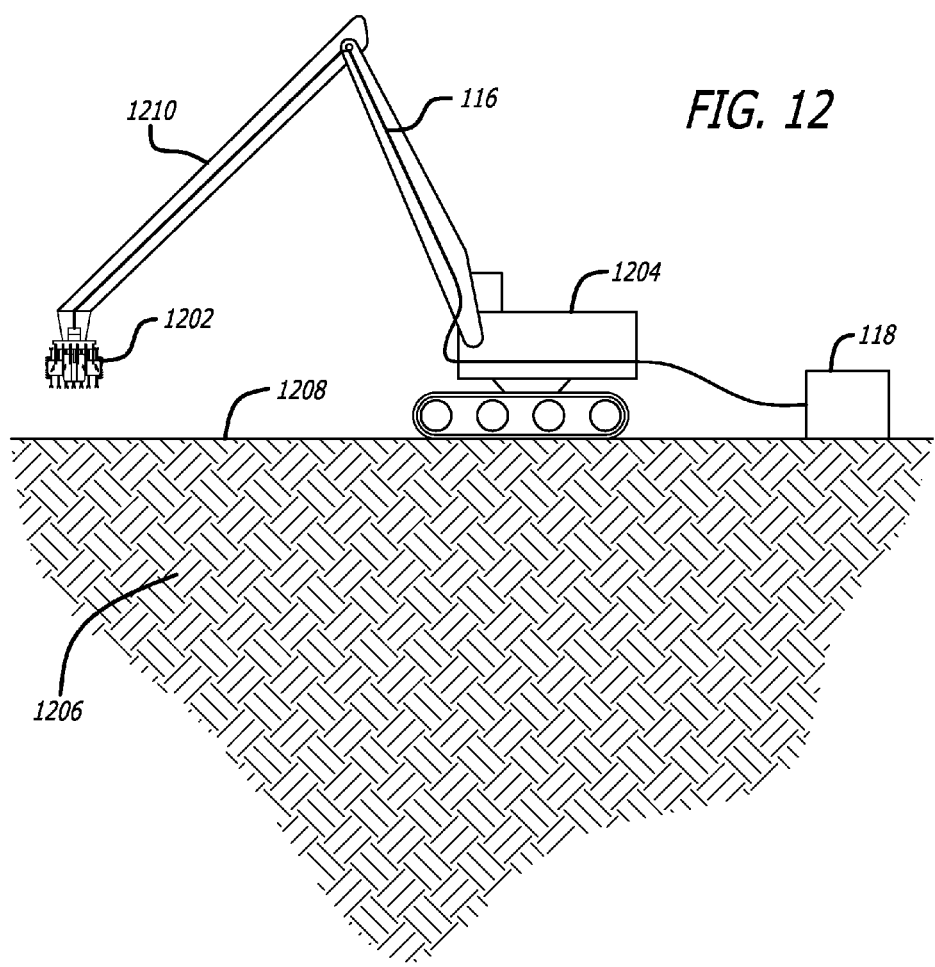
FIG. 12 illustrates an exemplary TRDC system according to the present description.
Figure 14:
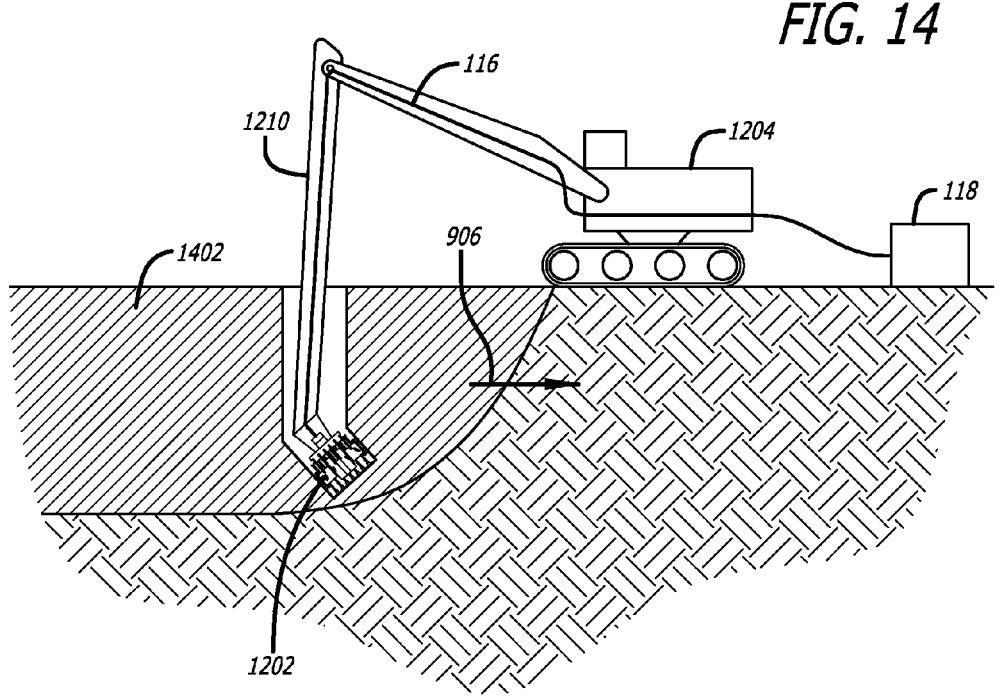
FIG. 14 illustrates a TRDC tool as it moves through and mixes the soil.

In FIG. 12, soil mixing tool 1202 can be mounted onto carrier 1204 and positioned above area 1206 where soil mixing is to commence. Soil mixing tool 1202 can be engaged with soil 1208 and begin excavation, as shown in FIG. 14. As soil mixing tool 1202 moves through the soil, a TAA such as a foam and a binding and/or impermeating agent can be injected into the soil through the feed line(s) 116.

Referring to FIGS. 13A-C, soil mixing tool 1202 can include rotating teeth 1302 to demould the soil and binding and/or impermeating agent can be injected through ports 1304 on the soil mixing tool mount 1306 to reduce equipment power requirement and soil density. The soil can be simultaneously excavated by the cutting teeth 1308 mounted on drum 1310 and mixed by the mixing blades 1312. Scraper bars 1314 on the cutting tool can prevent buildup of clay and soil on the mixing blades and drums.

As illustrated in FIG. 14, as carrier 1204 and soil mixing tool 1202 advances in direction 906, conditioned, bound, and/or impermeable soil 1402 may be left behind. Soil 1402 can have desired characteristics that are described further herein. As the reach of carrier arm 1210 is advanced to its maximum, carrier 1204 can be moved in direction 906 to a location that can further maximize the reach of arm 1210. This process can be repeated as needed.

Figure 15:
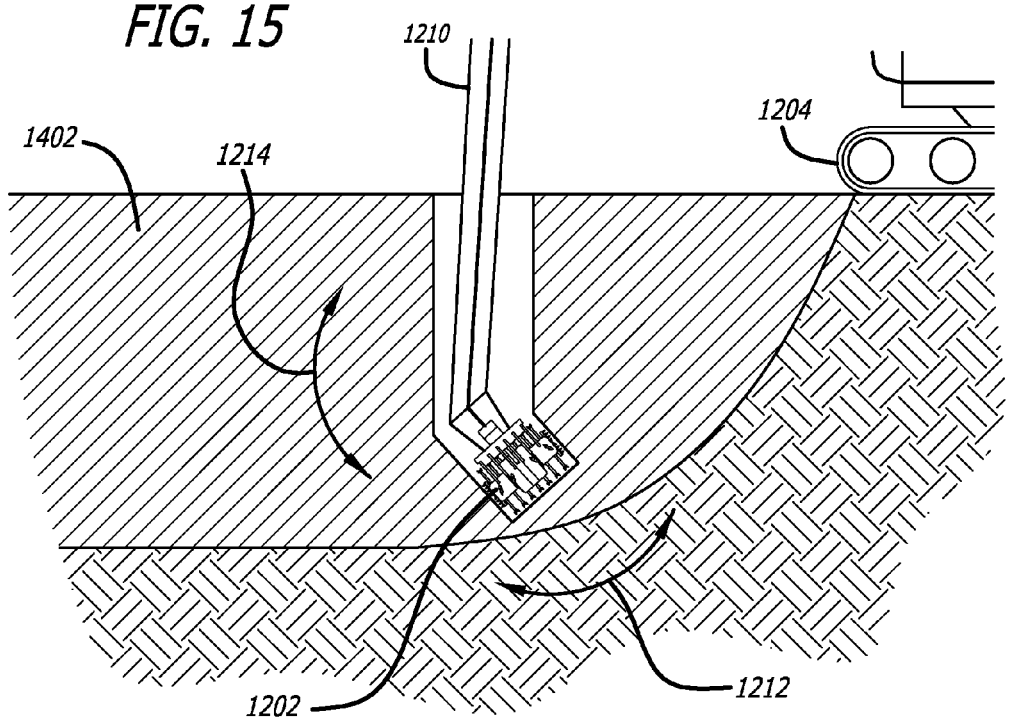
FIG. 15 illustrates the direction of TRDC tool movement through the soil.

Referring to FIG. 15, carrier arm 1210 can move soil mixing tool 1202 through the soil in an arch pattern 1212. In some instances, arch pattern 1212 can be the most economical pattern to achieve desired soil characteristics. In other embodiments, arch pattern 1214 can save the most cost. The use of carrier 1204 with carrier arm 1210 can be economical in and of itself. Such carriers are common on construction sites and can reduce the need to use unique heavy machinery that needs to be transported to the worksite for a specific and narrow task.

Figure 16:
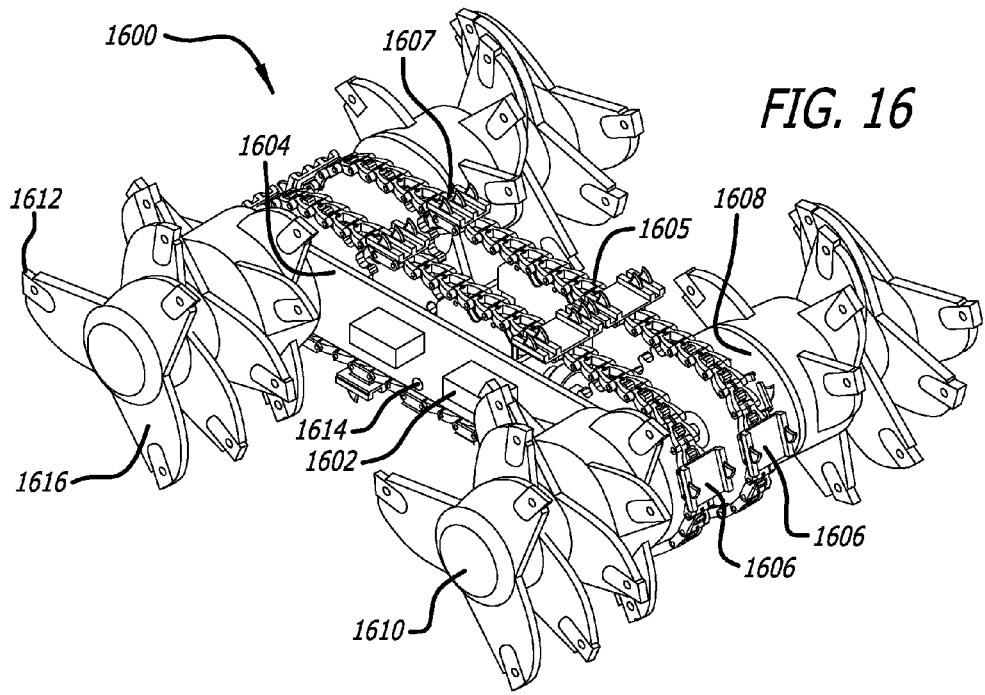
FIG. 16 illustrates an exemplary soil mixing tool.

In another embodiment, FIG. 16 illustrates another demoulding and mixing tool 1600 according to the present description. This configuration of mixing tool 1600 can be referred to as a Soil Cutting, Conditioning, and Mixing Machine (SC$^2$M$^2$). Generally, mixing tool 1600 has arm connection points 1602 and chassis 1604 circumferentially surrounded by at least one revolving chains 1605 (for example, one, two, or three revolving chains) fitted with ground engaging element holder flights 1606 and wear teeth or parts 1607. Variable width rotating drum 1610 may be attached to drum hub or rotor 1608 to increase or decrease trench or column width and volume of soil mixing and conditioning. Rotating drum 1610 may include at least one tooth holder cutting bar 1616. Cutting teeth 1612 can be attached to drum tooth holder cutting bar 1616 which is attached to the variable width rotating drum 1610 to simultaneously excavate and mix the soil. Chassis 1604 can further includes at least one nozzle 1614 situated at a location near the bottom of mixing tool 1600. In other embodiments, nozzles can be placed at different locations on chassis 1604 depending on the type of soil and/or the materials being delivered by each nozzle. In one embodiment, For example, mixing tool 1600 can include one, two, three, four, five, six, seven, eight, nine, ten, eleven, twelve, 13, 14, 15, 16, 17, 18, 19, 20, 21, 22, 23, 24, 25, 26, 27, 28, 29, 30, 31, 32, 33, 34, 35 or more nozzles.

Figure 17A:
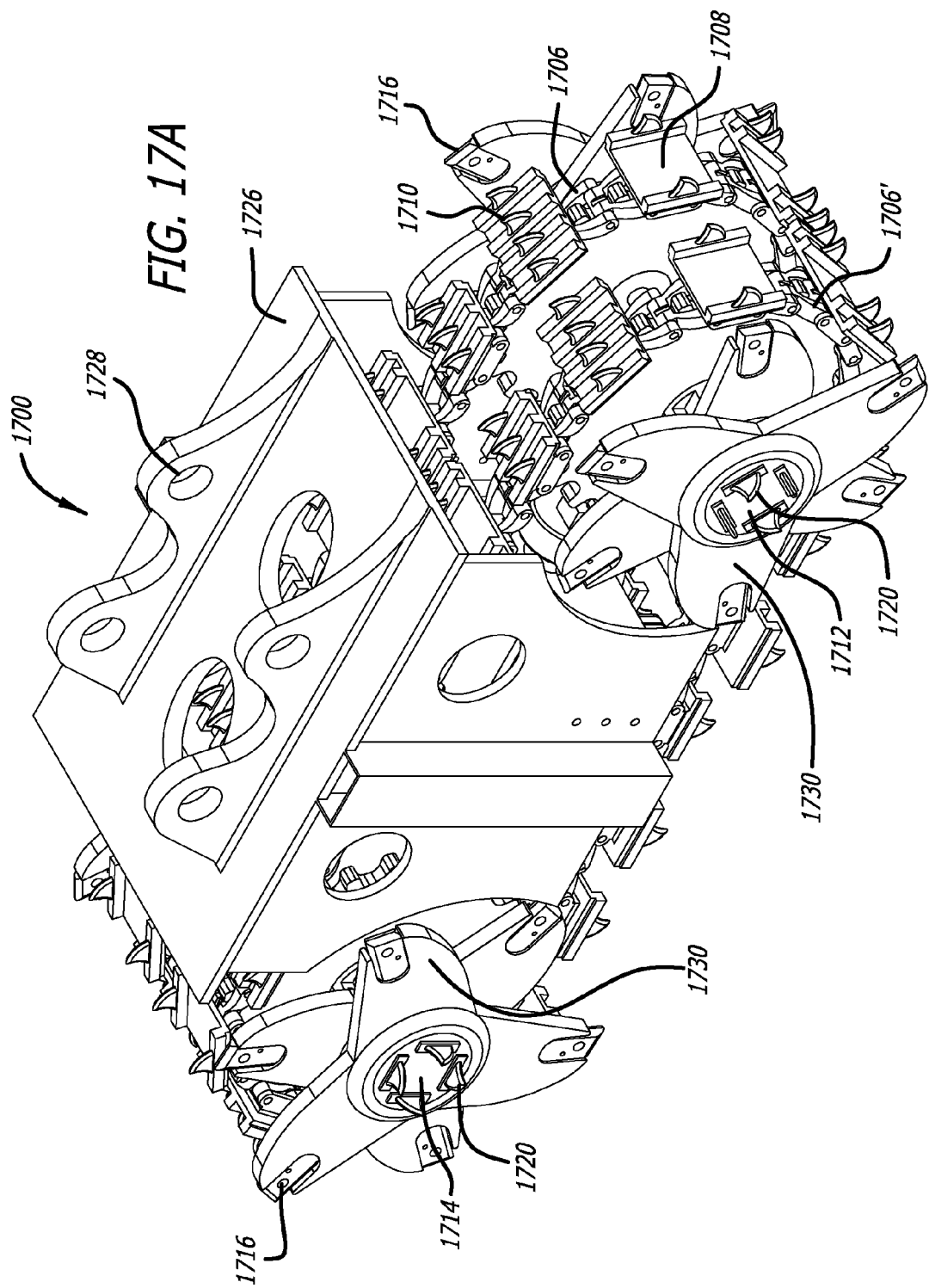
FIG. 17A-C illustrates an alternate embodiment of an exemplary soil mixing tool.
Figure 17B:
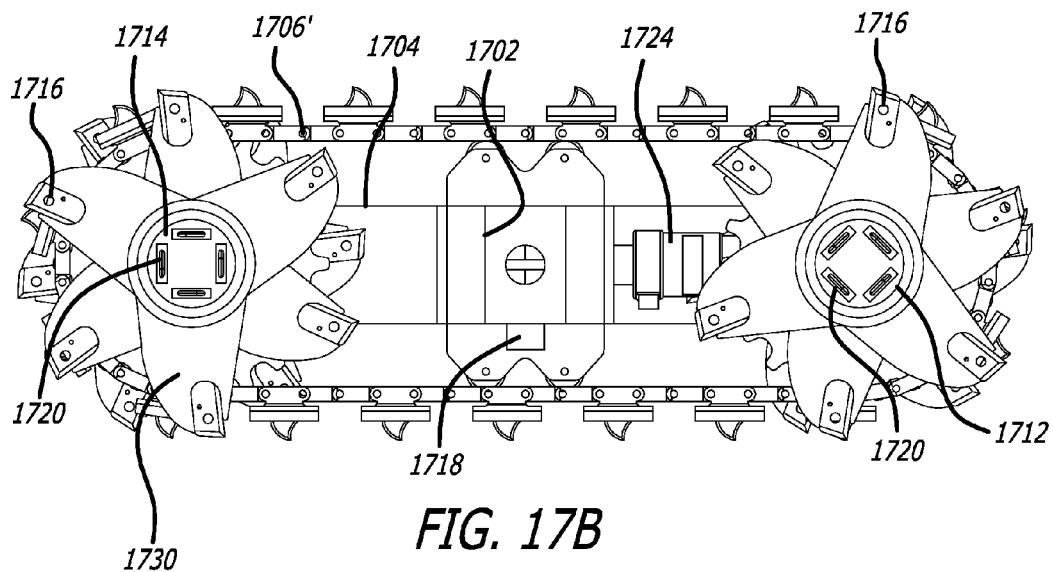
Figure 17C:
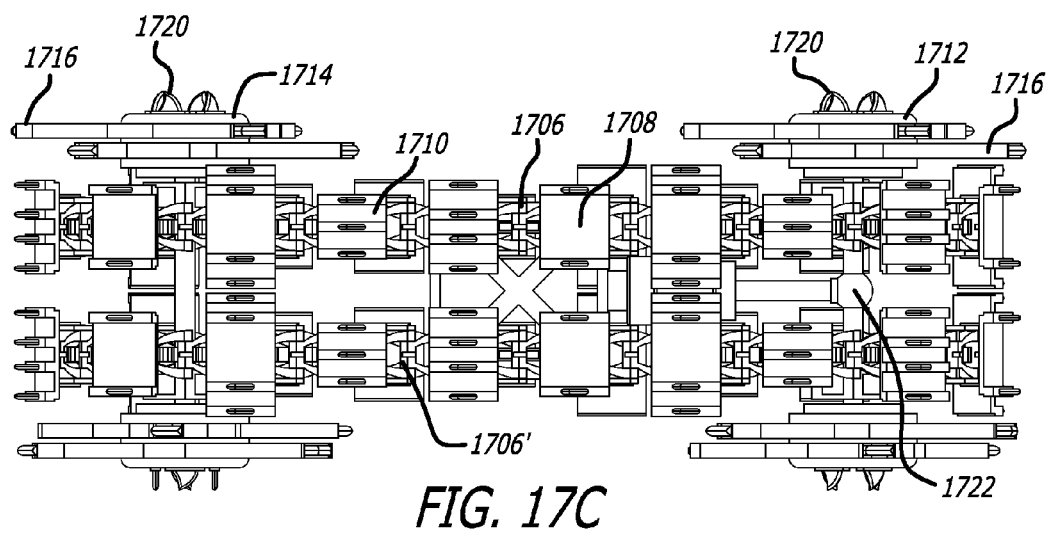

In another embodiment, an alternate demoulding and mixing tool 1700 is illustrated in FIGS. 17A-C. This configuration of mixing tool 1700 can also be referred to as a Soil Cutting, Conditioning, and Mixing Machine (SC$^2$M$^2$). Generally, mixing tool 1700 has arm connection points 1702 and chassis 1704 circumferentially surrounded by one or more revolving chains 1706, 1706' fitted with ground engaging element holder blades (flights) 1708 and wear teeth or parts 1710. In some embodiments, one, two, or three chains can be used. First rotating drum 1712 and second rotating drum 1714 may include at least one tooth holder cutting bar 1730. First rotating drum 1712 and second rotating drum 1714 may include at least one cutting tooth 1716 attached to drum tooth holder cutting bar 1730 to simultaneously excavate and mix the soil. Chassis 1704 further includes at least one nozzle 1718 situated at a location near the bottom of chassis 1704. In other embodiments, nozzles can be placed at different locations on chassis 1704 depending on the type of soil and/or the materials being delivered by each nozzle. First rotating drum 1712 and second rotating drum 1714 may further include cutting teeth 1720 on each face. Further, first rotating drum 1712 can include axle 1722 and can be turned by motor 1724. The motor can be electronically or hydraulically driven and can be water proof. In some embodiments, the motor and axle system can withstand moisture and pressure conditions that can exist as the mixing tool is advanced in the soil.

Figure 18A:
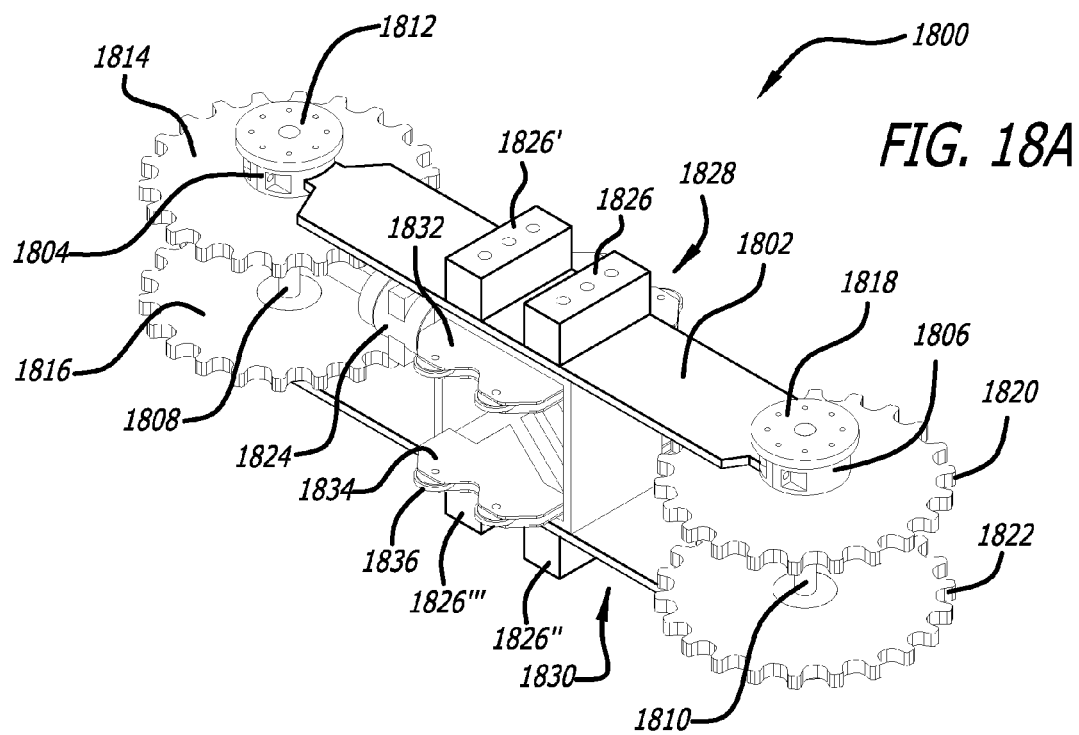
FIGS. 18A and 18B illustrate internal components of a mixing tool of FIG. 16 or 17A-C.
Figure 18B:
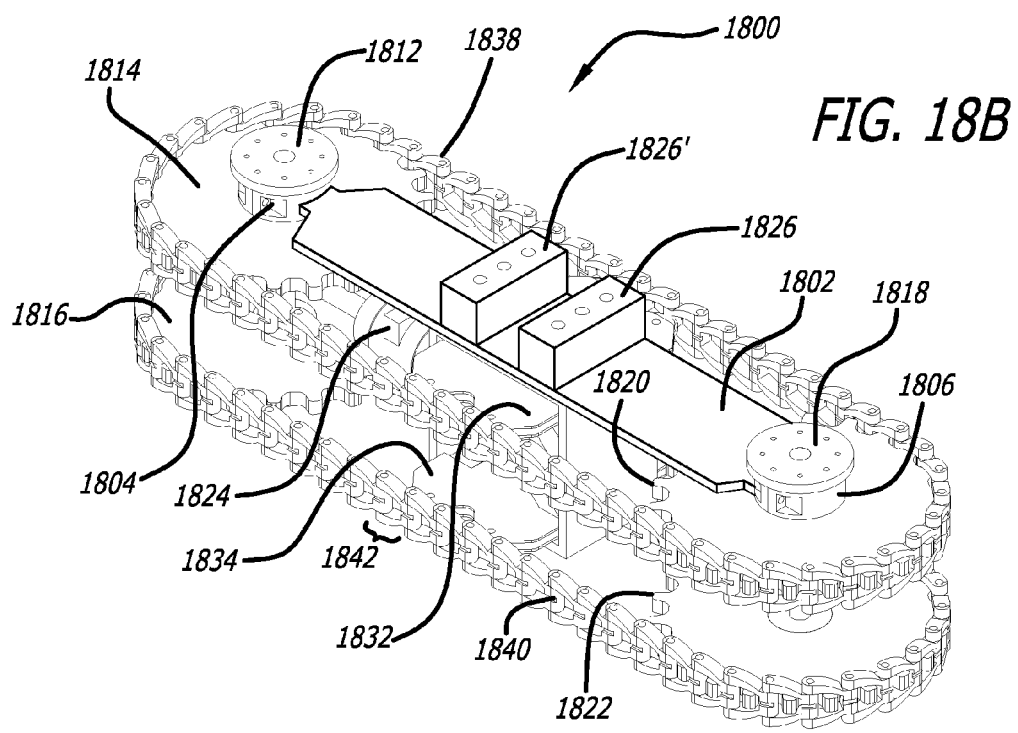

Mixing tool 1600 and 1700 can have similar internal components as illustrated in FIGS. 18A-B. These illustrations are non-limiting and differences and variation in tool configuration, size, and arrangement are within the scope of the present description.

Mixing tool 1600 or 1700 can comprise core structure 1800 including chassis 1802 which is equipped with front bearings 1804, 1804' and rear bearings 1806, 1806'. Drive axle 1808 and driven axle 1810 fit into bearings 1804, 1804' and 1806, 1806' respectively. Front rotors 1812, 1812' including front right sprocket 1814 and front left sprocket 1816 are fixed to front drive axle 1808. Rear rotors 1818, 1818' including rear right sprocket 1820 and rear left sprocket 1822 are fixed to rear driven axle 1810. Bearings 1804, 1804' allow front drive assembly including drive axle 1808, front right sprocket 1814 and front left sprocket 1816, and front rotors 1812, 1812' to rotate while securely fixed to chassis 1802. Bearings 1806, 1806' can further allow rear driven assembly including driven axle 1810, rear right sprocket 1820 and rear left sprocket 1822, and rear rotors 1818, 1818' to rotate while securely fixed to chassis 1802. Drive axle 1808 is rotated by means of through a differential or gear box (not illustrated) and powered by motor 1824.

Chassis 1802 further includes hard points 1826, 1826', 1826", 1826' on both front face 1828 and back face 1830. Chassis 1802 further includes first idler 1832 and second idler 1834. Each idler includes at least one roller 1836 to help guide and tension a chain when in motion.

Front right sprocket 1814 and rear right sprocket 1820 drive first chain 1838. Front left sprocket 1816 and rear left sprocket 1822 drive second chain 1840. Any number of sprockets and chains can be used. Outer chain faces 1842 may be coupled to flights as described. In one embodiment, one chain is used. In another embodiment, three chains are used with one chain spinning in an opposite direction compared to the other two chains. Drums can be attached to front rotors 1812, 1812' and rear rotors 1818, 1818' as described.

As previously described, chassis 1802 may include first idler 1832 and second idler 1834. An idler can be moved in and out providing proper tension to the chain. Idlers can help prevent flex of a chain as rollers 1836 allow the inner face of a chain to glide across the roller.

Mixing tool 1600 or 1700 can use a chain (e.g. first chain 1838 or second chain 1840) which can be an M style chain, K style chain, or any other chain type that will resist applied loads and wear conditions associated with the equipment's harsh operating environment. With an M style chain, the ground engaging element holder blade (flight) 1708 can be attached to the side of the chain while with a K style chain the ground engaging element holder blade 1708 can be attached to the top of the chain. In one embodiment, a chain can be manufactured by Vermeer, CAT, Can-Am, or any other manufacturer. In other embodiments, the chain model can be the 4501K/4501H from Vermeer, 623/D4 from CAT, WR-124 from Can-Am, or any other chain that meets the operating requirements of the tool.

A sprocket (e.g., sprocket 1814) can be chosen to match a particular chain. Also, depending on the desirable chain speed, the sprocket diameter may be in the range of 12 in to 24 in, 18 in to 30 in, 24 in to 36 in, 30 in to 42 in, 36 in to 48 in, or 42 in to 54 in. The number of sprocket teeth may depend on the sprocket diameter and the pitch and type of chain selected.

Mixing tool 1600, 1700 or core structure 1800 can be powered by at least one motor (e.g., motor 1824). In some embodiments, two, three, or four motors can be used. Each motor can drive one or more chains and or axles by utilizing a differential or angle gear box, when more than one motor is used, the chains can be driven in the same direction or opposite to each other to reduce carrier loading.

In one embodiment, counter rotating chains can be used in conjunction with the present tools. For example, three chains can be used with one axle driving the center chain in one direction and another axle driving two outside chains in the opposite direction of the center chain. This design can optimize equipment energy by providing multiple high shear zones and may limit required resisting capacity of the carrier. In other embodiments, any number of counter rotating chains can be used driven by at least two different axels. For example, three, four, five, six, seven, eight, nine, 10, 11, 12, 13, 14, 15, 16, 17, 18, 19, 20 or more counter rotating chains can be used.

Mixing tool 1700, 1202, 1600 or core structure 1800 can have one, two, three, four, five, six, seven, eight, nine, ten, eleven, twelve, 13, 14, 15, 16, 17, 18, 19, 20, 21, 22, 23, 24, 25, 26, 27, 28, 29, 30, 31, 32, 33, 34, 35 or more cutting teeth per drum. Each chain can have one, two, three, four, five, six, seven, eight, nine, ten, eleven, twelve, 13, 14, 15, 16, 17, 18, 19, 20, 21, 22, 23, 24, 25, 26, 27, 28, 29, 30, 31, 32, 33, 34, 35 or more flights (holder blades) and/or wear teeth or parts. Flights and wear teeth can be alternated on a chain, in an arrangement of 2×2, or the like. In some embodiments, only flights are used. In other embodiments, only wear teeth are used. A rotating drum can also include one, two, three, four, five, six, seven, eight, nine, ten, eleven, twelve, 13, 14, 15, 16, 17, 18, 19, 20, 21, 22, 23, 24, 25, 26, 27, 28, 29, 30, 31, 32, 33, 34, 35 or more cutting teeth on its face.

Teeth 1612 and 1720 can have a shape that is appropriate for a soil or rock type of interest. For example, teeth can have a triangular shape. In other embodiments, teeth can have an inner curved cutting edge that can be sharpened and an outer curved non-cutting edge. Any other tooth shape known in the art can be used. For example teeth shaped as picks can be used. In other embodiment, each tooth can be attached to a holder from which the tooth can be easily removed and replaced without tool deconstruction.

Mixing tool 1600, 1700 or core structure 1800 can have a width, drum end to drum end of about 1 ft, about 2 ft, about 3 ft, about 4 ft, about 5 ft, about 6 ft, about 7 ft, about 8 ft, about 9 ft, or about 10 ft. If a single pass with a mixing tool is used, the width of the mixing tool can define the width of a trench or column.

Mixing tool 1600, 1700 or core structure 1800 can have a length of about 1 ft, about 2 ft, about 3 ft, about 4 ft, about 5 ft, about 6 ft, about 7 ft, about 8 ft, about 9 ft, about 10 ft, about 12 ft, about 14 ft, about 16 ft about 18 ft or about 20 ft. If a single pass with a mixing tool is used, the width of the mixing tool can define the width of a trench or column.

To connect mixing tool 1600, 1700 or core structure 1800 to an arm of a machine 1210, a coupler or mount 1726 can be attached to connection points 1602 or 1702, or hard points 1826, 1826', 1826", 1826'". The coupler 1726 is attached to a carrier arm (stick) 1210 using bushing (bolt holes) 1728.

Figure 19:
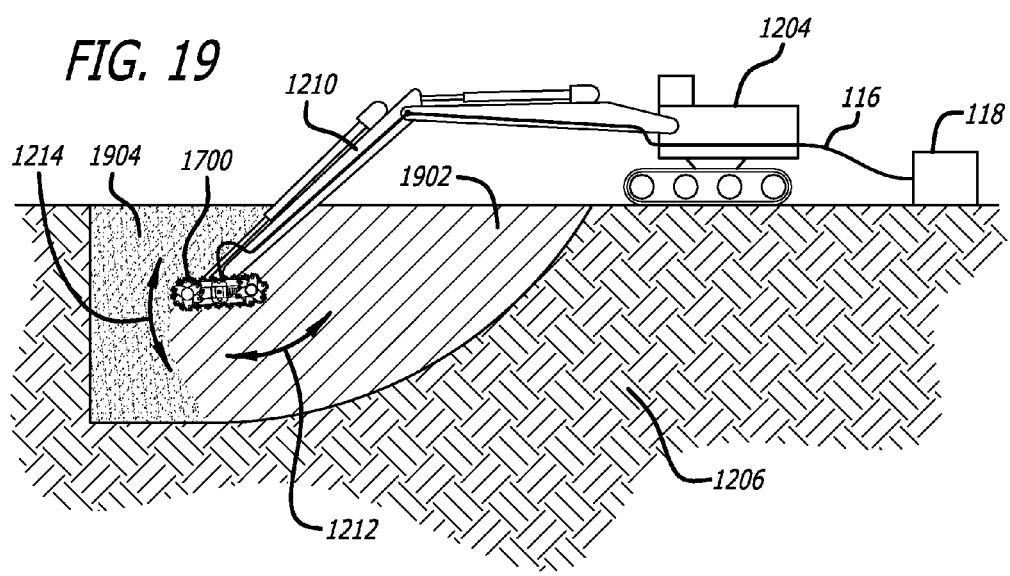
FIG. 19 illustrates an exemplary in situ binder mixing system according to the present description.

In FIG. 19, mixing tool 1600, 1700 or core structure 1800 can be mounted onto carrier 1204 using coupler 1726 connected to both carrier arm 1210 and chassis 1604 or 1704 and positioned above the area 1206 where soil mixing is to commence. Mixing tool 1600, 1700 or core structure 1800 can then be engaged with the soil and begin excavation and/or demoulding. As mixing tool 1600, 1700 or core structure 1800 moves through the soil in an arch pattern 1212, a TAA such as a foam to reduce soil density and a binding and/or impermeating agent to increase the soil strength can be injected into the soil through the feed line(s) 116 and nozzles on chassis 1704. The TAA and binding agent can be injected simultaneously or separately. If injected separately, the TAA can be injected first to condition and reduce the density of the soil and then the binding agent can be added to strengthen the soil using an alternative arch pattern 1214. As such, the process illustrated in FIG. 18 can be a one step or two step process.

As carrier 1204 and mixing tool 1600, 1700 or core structure 1800 advance through unconditioned soil of interest 1206, conditioned 1902 and bound/impermeable soil 1904 can be left behind as shown in FIG. 19. Mixing tool 1600, 1700 or core structure 1800 can be moved through the soil in arch pattern 1212 or 1214 as described previously and fed materials from work box 118 through lines 116.

Another soil mixing system is illustrated in FIGS. 20A-C. Vertical axis rotary tool 2000 is attached to carrier 100 by mast attachment 112. A TAA used to treat the in situ soil may be injected through hollow shaft 2002 and comes out of injection hole 2004 at low or high pressure. The TAA material can be introduced in the dry or slurry form depending on the soil properties and design requirements. The TAA material can consist of water, air, foam, or grout or a combination of two or more. TAAs can be injected on the down stroke 304 and/or on the upstroke 502 depending on the soil properties desired.

Soil cutting tool 2006 is attached to the bottom of shaft 2002 to aid in the insertion of the vertical axis rotary tool 2000 into soil 2008. Shaft 2002 above cutting tool 2006 can be outfitted with discontinuous auger flights, blades, or paddles 2010 or a combination thereof as needed to further mix and condition the soil.

When two or more rotary tools are used, the shafts can rotate in the same direction or be setup to counter-rotate 2012. The shaft rotation can also be reversed on the upstroke 502 to aid in tool extraction from the ground. Paddles 2010 can be configured on each tool to not impede with the adjacent tool. Also, various shapes and sizes of soil cutting tool 2006 can be used.

Figure 21:
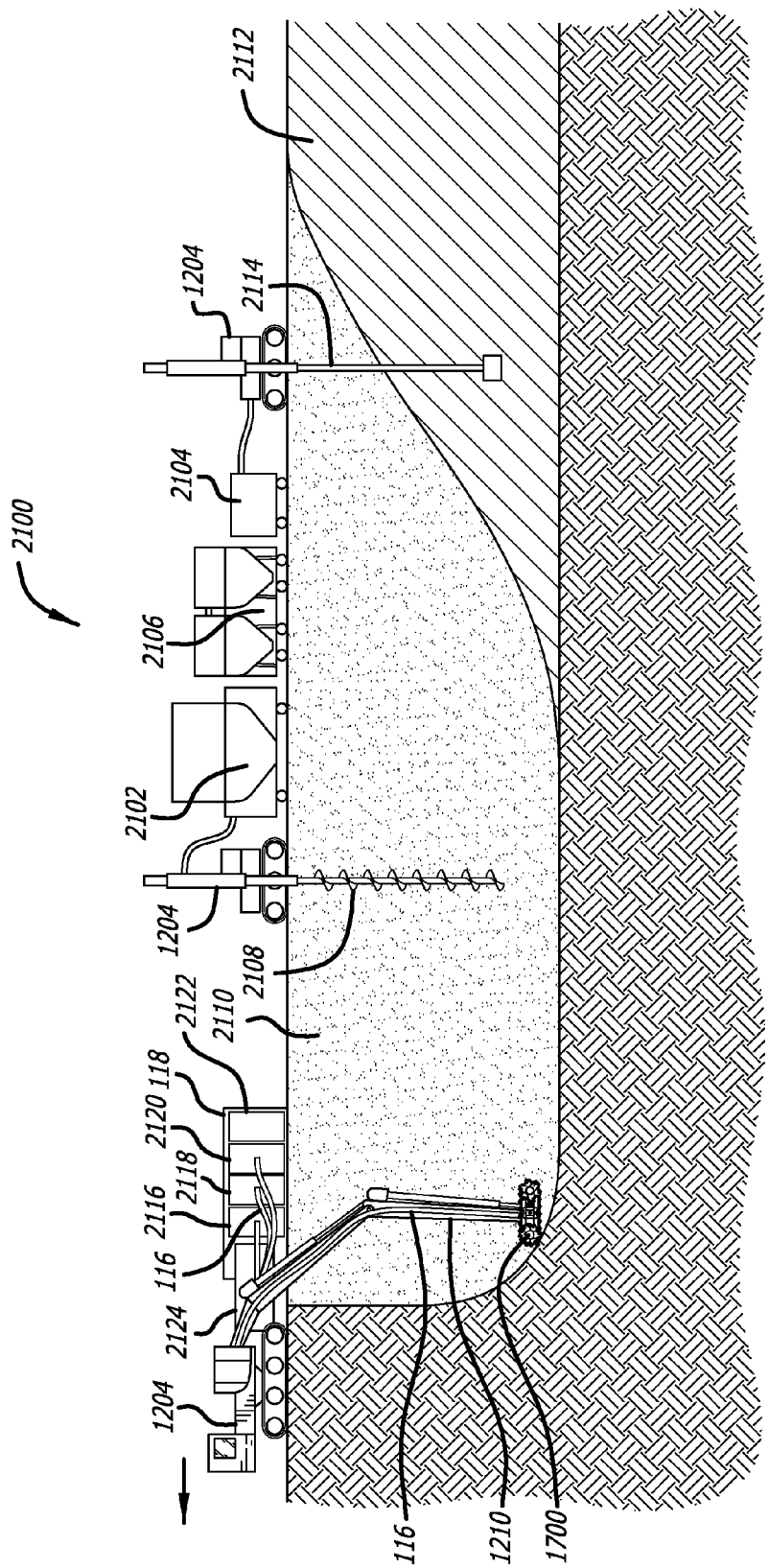
FIG. 21 illustrates an exemplary surface binder mixing system according to the present description.
Figure 22:
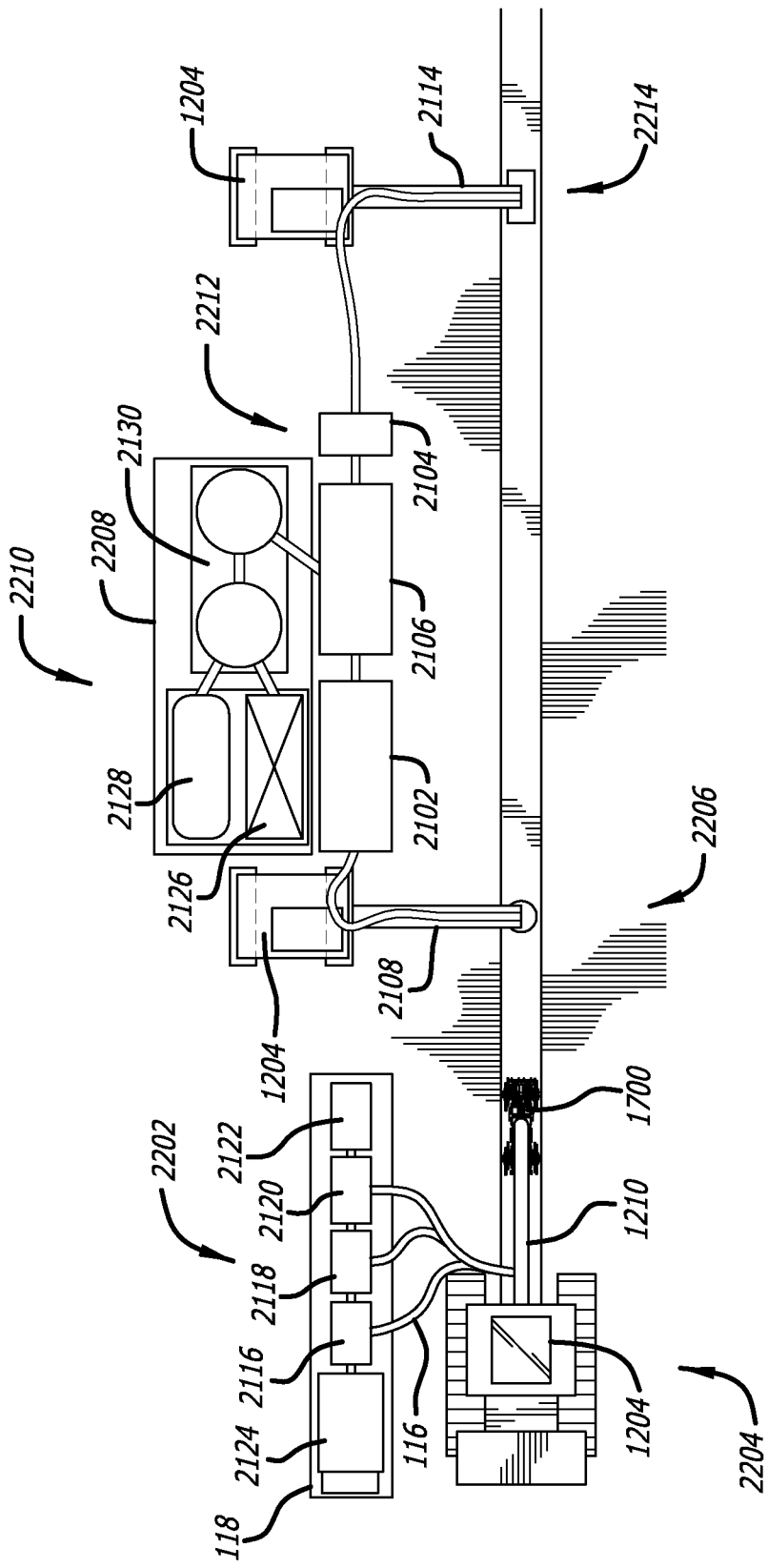
FIG. 22 illustrates a plan view of an exemplary surface binder mixing system according to the present description.

FIGS. 21 and 22 illustrate an exemplary surface binder mixing system 2100 according to the present description. System 2100 can include storage tank 2102, pump 2104, mixing plant 2106 and batching plant 2208. Carrier 1204 includes arm 1210 and mixing tool 1600, 1700 or core structure 1800 attached to arm 1210. Work box 118 can feed lines 116 providing material (e.g., one or more TAA) to nozzles 1718 or 1614 located on the mixing tool. A conveyor 2108 such as a screw conveyor or auger can be attached to another carrier 1204 as illustrated in FIG. 20 to extract conditioned soil 2110 from the trench and into the mobile soil mixing plant (MSMP). Once the conditioned soil is processed it can be re-inserted back into the ground using a nozzle 2114 attached to a carrier 1204 arm. In one embodiment, conditioned soil can simply be poured on top of conditioned soil 2110 after which time the processed, denser soil will sink to an appropriate depth within the conditioned soil.

A plan view of the process is illustrated in FIG. 22. In a first step 2202, soil conditioning foam, and/or high pressure water and/or high pressure air is generated and injected from work box 118 into lines 116. Work box 118 can include high pressure water generator 2116, foam generator 2118, air compressor 2120, and power generator 2122. A water truck 2124 can be used to supply water to the system.

Then in a next step 2204, the soil can be demoulded with a foam conditioning agent and/or other soil mixing additives (water or air) and mixing tool 1700. Then at step 2206, conditioned soil 2110 is extracted using conveyor 2108 and is stored in holding tank 2102. Conditioned soil 2110 is continuously feed from holding tank 2102 into the mixing plant 2106. Then at point 2210, mixing plant 2106 can be used to mix dry cement, cement slurry, or bentonite-cement slurry generated at batching plant 2208 with conditioned soil 2110. Batching plant can include cement silo 2126 and a hydrated bentonite storage and agitator tank 2128 both of which can feed colloidal mixer and agitator 2130. Bathing plant 2208 can feed mixing plant 2106. Further in the process, chemical defoamers can be added to destroy the conditioned soil's bubble structure and increase the mixed soil's density.

At point 2212, pump 2104 can be used to transfer the higher density mixed soil/cement 2112 to the soil-binder injection tool 2114 which is attached to another carrier 1204. Finally, at point 2114, mixed soil/cement 2112 can be injected back into the trench or column using the soil-binder injection tool 2114. Soil-binder injection tool can be a tremie pipe attached to a carrier arm. The soil-binder injection tool 2114 can be moved up and down in order to inject the soil/cement soil 2112 at different elevations to keep it separated from the conditioned soil 2110 much like two immiscible fluids.

The two stage approach illustrated in FIGS. 21 and 22 can save time and money as high powered equipment is only used for demoulding and conditioning the soil while lower power and more thorough equipment can be utilized for binder addition and mixing, resulting in higher system production rates, higher quality improved soil, and lower overall system energy requirements when compared to the amount of work needed to achieve the same result in a single step using conventional heavy machinery.

In one embodiment, at step 2206, the capacity of conveyor 2108 can be increased or decreased as needed for a particular goal. In some embodiments, the capacity of conveyor 2108 can be increased beyond the capacity of mixing plant 2106 thereby allowing extra conditioned soil to be re-circuited back into the trench or column mixing the different geologic strata and improving overall quality (e.g., homogeneity) of the final soil mix element.

In some embodiments, conveyor 2108 can recirculate conditioned soil at a rate of about 50 yd$^3$/hr, about 60 yd$^3$/hr, about 70 yd$^3$/hr, about 80 yd$^3$/hr, about 90 yd$^3$/hr, about 100 yd$^3$/hr, about 110 yd$^3$/hr, about 120 yd$^3$/hr, about 130 yd$^3$/hr, about 140 yd$^3$/hr, about 150 yd$^3$/hr, about 160 yd$^3$/hr, about 170 yd$^3$/hr, about 180 yd$^3$/hr, about 190 yd$^3$/hr, or about 200 yd$^3$/hr.

The systems and tools described herein when compared to conventional DMM systems can produce a lower cost per unit by reducing overall soil mixing equipment capital cost, minimize transportation and/or mobility cost, efficiently allocate system power (mechanical energy) requirements, provide high power requirement to demould soil and make soil malleable, utilize efficient power usage to mixing binder (e.g. lower power demand), quietly operate, reduce vibration, provide an ability to change ground engaging tools depending on soil type and/or strength, provide a high soil penetration rate, provide a highly homogenous product, provide a lower required binder mixing time, provide a large soil contact surface area, provide an overall productivity greater than about 50 CY/hr, provide a high degree of real time QA/QC, provide ability to operate in low headroom, and/or provide ability to accommodate alignment changes.

The systems described herein can also provide lower in situ mixed soil unit costs for smaller sized projects such as arsenic and tar-wood treatment facilities.

The SC$^2$M$^2$ tools, for example, described herein can be configured to attach to 50,000 lb, 100,000 lb, 150,000, 200,000, or 250,000 lb long reach excavators. The tools themselves can weigh less than about 12,000 lbs, about 10,000 lbs, about 8,000 lbs, about 6,000 lbs, or about 4,000 lbs. Tools can further be configured to mount to conventional excavator bucket hard points stick and crowd cylinder such as at bolt (pin) holes 1728 permitting movement similar to conventional excavator bucket rotation geometry.

In some embodiments, a chain (e.g. revolving chains 1605 or 1706, 1706', or first chain 1838 or second chain 1840) and drum rotation can operate in the same longitudinal direction as an excavator's boom and stick (e.g., arm 1210) geometry (i.e., parallel or in alignment with excavator's trenching operation). In other embodiments, the chain and drum rotation can operate perpendicular to the direction of the excavator's boom and stick.

Further, the tools described can be supplied with materials (e.g., high pressure air, water, binder, TAA, etc) by a combination steel piping and flexible hoses from above ground facilities (e.g., hydraulic power, foam generation, grout batching, high pressure water, and air) to the excavator chassis and then down the boom and stick. A mixing tool 1600, 1700 or core structure 1800 can be outfitted with grout, foam, high pressure water, and/or compressed air outlets/nozzles that can be used to treat and condition soil.

The described tools can include foam, air, and high pressure water systems as described. Foam generation can occur in a "gun" that may need to be very near (e.g., within 20 feet) of a nozzle outlet. Foam concentrate (e.g., a liquid with viscosity of water) and "foam only dedicated" air supply can travel down an arm to a foam gun recess designed into or on the arm or tool where the foam is created. Foam and high pressure air can be combined at or near the nozzle outlet with bursts of air (pulsing) used to assure the low pressure foam nozzles are not clogged. Further, as foam bubbles may be compressible under pressure, foam expansion rate can be changed with varying depth (i.e., pressure). To accomplish this, sensors at a desired depth can be used to regulate the proportions of air and concentrate at the foam generator (gun).

In some embodiments, the systems described herein and even the tools themselves can acquire in situ soil data collection including vertical and horizontal position (X, Y, Generally, mixing tools and systems described herein can have advantageous requirement parameters when compared to convention DMM systems. Some exemplary advantageous requirement parameters are tabulated below in Table 1 based on technology.

TABLE 1

| Tool | Max Input Power | | Max Rotation | Max Torque* | Advance Rate | Treatment Area |
|---|---|---|---|---|---|---|
| | (Hp) | (kW) | (rpm) | (ft-lbf) | (ft/min) | (ft$^2$/hr) |
| Vertical Axis | | | | | | |
| Typical Operating Range | 95-600 | 70-400 | 10-200 | 8,500-175,000 | 0.5-2.75 | 50-275 |
| Using present tools and systems TRDC | 50-600 | 38-400 | 5-200 | 2,500-175,000 | 0.5-15 | 50-750 |
| Typical Operating Range | 30-190 | 20-140 | 30-200 | 3,000-35,000 | 0.5-2.75 | 30-175 |
| Using present tools and systems TRD | 10-190 | 7-140 | 10-200 | 900-35,000 | 0.5-15 | 30-750 |
| Typical Operating Range | 500-800 | 350-650 | 30-85 | 8,500-255,000 | 0.5-4.5 | 350-1,650 |
| Using present tools and systems CSM | 200-800 | 140-650 | 10-85 | 2,500-255,000 | 0.5-20 | 350-5,000 |
| Typical Operating Range | 280-550 | 300-400 | 15-40 | 75,500-150,000 | 0.5-2.25 | 300-850 |
| Using present tools and systems | 120-550 | 130-400 | 5-40 | 22,650-150,000 | 0.5-15 | 300-2,000 |

*Max torque is determined at 350 bar (5,000 psi)

and Z), implement operating torque, drum RPM, TAA injection rates and volumes, and/or soil pressure.

Further, mixing tools can be sufficiently rugged for a given soil mixing environment. The tools can withstand a 100% working hour availability. Further, lubrication, cutter replacement, and other maintenance can be accomplished at breaks/lunches/shift changes or planned hours of non-operation, thereby saving money in operation.

The tools can be designed to operate at elevations up to 80 feet below grade while submerged in a soil-slurry mixture. Enclosed compartments, seals, and bearings can be pressure compensated. In some embodiments, bearings may be constantly lubricated.

Depending on the chain speed and the soil of interest, the tools and systems described herein can have an initial excavation rate target of about 1.8 yd$^3$/min of demoulded soil or a penetration rate at 24 in/min. The described tools can have connection points to accommodate cutter teeth cleaning bars and additive manifolds and nozzles. Further, the tools can have 100% "back of chain" support to limit uneven wear, variable excavation face depth, and "chain slap" created by unsupported chain riding over intermittent positioned rollers.

Drums 1610, first rotating drum 1712, and/or second rotating drum 1714 can be easily replaced with alternate diameter and length drums. Further, drums can be equipped with teeth on their end 1720 to assure drum "plunge cutting" at the trench edge accommodating easy movement along the trench as illustrated in FIGS. 17A-C.

Power requirements for the tools described herein can be based on available supplies. Such power requirements can be about 25 KW to about 500 KW, 75 KW to about 450 KW, about 100 KW to about 400 KW, about 125 KW to about 350 KW, about 100 KW to about 300 KW, about 150 KW to about 250 KW, about 125 KW to about 325 KW, or about 150 KW to about 225 KW.

Generally, the systems described herein and their tools can include operator position and safety features which are in conformance with regulatory worker safety requirements such as OSHA. Normal working conditions for the above systems and methods generally can be embraced by the following working ranges, but can vary. The CSM treatment surface area (face) ranges between 15 square feet and 25 square feet (depending on application and project requirements). TRDC soil mixing tool treatment area may range between 10 square feet and 20 square feet. In other embodiments, such as the TRD method, the treatment surface area is between about 25 square feet and about 350 square feet.

The advance rate, depending on the system, soil conditions, or TAA used, can range between about 1.0 ft/min and about 3.5 ft/min, or about .75 ft/min and about 2.5 ft/min. In other embodiments, the advance rate can range between about 0.5 ft/min and about 2 ft/min, between about 0.2 ft/min and about 1.5 ft/min, or between about 0.1 ft/min and about 1.0 ft/min.

Teeth as described herein for any tool can be formed of an appropriate metal, metal alloy, crystalline compound, polymer or a combination thereof. For example, carbide, stainless steel, diamond or the like may be used to form teeth. Teeth can have shapes that are appropriate for a soil or rock type of interest. For example, teeth can have a triangular shape. In other embodiments, teeth can have an inner curved cutting edge that can be sharpened and an outer curved non-cutting edge. Any other tooth shape known in the art can be used.

Pre-conditioned soil densities can range between about 90 pcf and about 115 pcf. In other embodiments, soil densities range from about 50 pcf to about 140 pcf, from about 75 pcf to about 130 pcf, or from about 60 pcf to about 125 pcf. Pre-conditioned SPT blow counts can range between about 1 and about 40, about 0.5 and about 50, about 0.25 and about 80, or about 5 and 20.

The tools described herein can rotate between about 20 RPM and about 150 RPM, between about 30 RPM and about 140 RPM, between about 20 RPM and about 120 RPM, or between about 10 RPM and about 75 RPM. Rotation speeds in some cases can be based on soil or rock strength and overall environmental and/or nuisance concerns.

Further, for TRD or $SC^2M^2$ technologies, chain speeds can range from about 100 ft/min to about 1,000 ft/min, about 150 ft/min to about 900 ft/min, about 200 ft/min to about 600 ft/min, or about 300 ft/min to about 500 ft/min. In other embodiments, the chain speed can be about 100 ft/min, about 200 ft/min, about 300 ft/min, about 400 ft/min, about 500 ft/min, about 600 ft/min, about 700 ft/min, about 800 ft/min, about 900 ft/min, or about 1,000 ft/min.

Motors described herein to drive mixing tools can have outputs of about 10 hp, about 50 hp, about 100 hp, about 150 hp, about 200 hp, about 300 hp, about 400 hp, about 500 hp, about 600 hp, about 700 hp, or about 800 hp, between about 250 hp and about 600 hp, about 100 hp and about 500 hp, about 200 hp and about 400 hp, or any range formulated between any of the listed values.

Trench, shaft, or column depths achievable using the tools, systems, and methods described can be about 10 ft, about 20 ft, about 30 ft, about 40 ft, about 50 ft, about 60 ft, about 70 ft, about 80 ft, about 90 ft, about 100 ft, about 110 ft, about 120 ft, about 130 ft, about 140 ft, about 150 ft, about 160 ft, about 170 ft, about 180 ft, about 190 ft, or about 200 ft. In one embodiment, trench, shaft, or column depths can be less than about 120 ft, less than about 100 ft, less than about 80 ft, or less than about 60 ft. Generally, ground water is at about 5 ft., about 10 ft., about 15 ft., about 20 ft., about 30 ft., about 40 ft., about 50 ft., about 60 ft., about 70 ft., about 80 ft., about 90 ft., about 100 ft., or about 120 ft.

Trench widths achievable using the tools, systems, and methods described can be about 1 ft, about 2 ft, about 3 ft, about 4 ft, about 5 ft, about 6 ft, about 7 ft, about 8 ft, about 9 ft, about 10 ft, about 12 ft, about 14 ft, about 16 ft, about 18 ft, about 20 ft, about 22 ft, about 24 ft, about 26 ft, about 28 ft, about 30 ft, about 32 ft, about 34 ft, about 36 ft, about 38 ft, about 40 ft, or more.

EXAMPLE 1

Sample Normalized Conditions for Lubricated Soil Mixing Tool

Tools such as that illustrated in FIGS. 16 & 17A-C is fitted on an excavator arm (boom and stick). The following are proposed normalized work plan and soil conditions.

The treatment surface area (face of the tool) can be approximately 24 sqft (depending on application and project requirements). The advance rate (depending on material) can range between 1.25 ft/min and 2.25 ft/min. Soil densities can range between 90 pcf and 115 pcf. SPT blow counts can range between 1 and 40. The tools can rotate between 20 and 65 RPM. Chain speeds may be between 185 and 700 ft/min.

The tool torque can range from 37,300 lb. ft. to as high as 70,000 lb. ft. or 93 kN-m. There may be one "sprocket equipped" drive axle and wheel assemble that includes two drums with ground engaging elements, and two 12" wide parallel chains equipped with intermittent flights and ground engaging elements that in turn power a second axle (driven) which has a second set of drums also equipped with ground engaging elements. Trench depth can be 45 ft but can be as deep as 80 ft. Ground water can be at 10 m.

Industry uses a combination of air, bentonite, and/or cement slurries mixed with the soil. The present systems and methods can incorporate conditioning foam during the demoulding phase, and have two options for binder integration. First is to inject the slurry or pulverulent in-ground using the tool to mix the conditioned soil with the binder. The second option transports the conditioned soil to the surface using a screw conveyor wherein the material can be mixed in a surface located batch plant and then re-injected back into the trench or column.

Soil types can range from silty clay, clayey silt and sandy silty clays to noncohesive sands and gravels. Soil materials can range from loose to firm to cemented. These can be encountered over fairly short distances and may need to be treated by one product rather than having the ability to change foam types during tool advance. Lower torque requirements at the face of the excavation, cool the cutting tools, and mix the soil resulting in a homogenous mix in the 70 pcf to 80 pcf range can be achieved. The soil can be mixed and stabilized with the use of foam as the tool advances along an arched heading as illustrated in FIG. 18 dictated by the geometrics of the excavator's boom and stick.

EXAMPLE 2

Demoulding, Conditioning, and Binder Mixing in One Step

Again, using processes depicted in FIG. 19 with a tool as illustrated in FIGS. 16 and 17A-C attached to an excavator arm (boom and stick), soil demoulding is commenced. Following initial soil cutting and mixing with soil conditioning foam additive creating a homogenous blended soil, the foam conditioner flow can be stopped and cement or bentonite-cement binder can then be added through the implement before the excavator advances. The geometry of arm movement during cutting would follow the bucket loading sequence during normal excavator function 1212. The binder mixing can occur with the stick extending up into preconditioned soil 1214. Alternatively following initial soil cutting and mixing, a second piece of soil mixing equipment can follow and blend cement, bentonite-cement, or bentonite binders into the foam conditioned soil creating the improved geotechnical element. In agricultural applications, soil amendments can be added to the conditioned soil.

EXAMPLE 3

Demoulding, Conditioning, and Binder Mixing in Two Steps

Again, using processes depicted in FIGS. 19, 21 and 22 with a tool as illustrated in FIGS. 16 and 17A-C attached to an excavator arm (boom and stick), soil demoulding is commenced. During initial soil cutting and mixing with soil conditioning foam additive creating a homogenous blended soil, a conveyor attached to the stick of the excavator or other carrier can lift mixed soil up to the surface and deposit the muck into a storage container. As needed, the muck can be transferred (pumped) to a continuous operating cement slurry batching and soil mixing station wherein the homogenized soil and bentonite and or neat cement slurry can be mixed and then redeposited into the prior excavated trench. The heavier (more dense) soil cement mix settles to the bottom of the trench forming a descending arch as the mixture flows along the bottom of the trench. As the heading is continuously advanced by the demoulding and conditioning equipment, the blended soil-cement can be continuously replaced creating a high quality soil-cement trench.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. A system for improving soil comprising:
   a soil mixing tool including a chassis including at least two counter revolving chains each including at least one ground engaging element holder, wherein the soil mixing tool is configured to create conditioned soil, improved soil or a combination thereof;
   a conveyer configured to remove the conditioned soil, improved soil or a combination thereof;
   a mobile soil mixing plant, wherein the conveyor is configured to present the conditioned soil improved soil or a combination thereof into the mobile soil mixing plant to prepare processed soil; and
   a nozzle configured to re-insert the processed soil back into the soil.

2. The system of claim 1, wherein the conveyor pumps the conditioned soil, improved soil or a combination thereof into the mobile mixing plant.

3. The system of claim 1, wherein the conveyor removes the conditioned soil at a rate between about 50 yd$^3$/hr and about 200 y$^3$/hr.

4. The system of claim 1, wherein the nozzle can re-insert the processed soil at varying depths in the soil.

5. The system of claim 1, wherein the nozzle can re-insert the processed soil by pouring it on top of the conditioned soil, improved soil, or a combination thereof.

6. The system of claim 1, wherein the mobile soil mixing plant further includes: a holding tank, a batching plant, or a combination thereof.

7. The system of claim 6, wherein the batching plant includes a cement silo, a storage tank, an agitation tank, a mixer, an agitator, or a combination thereof.

8. The system of claim 1, wherein the conditioned soil, improved soil, or a combination thereof includes at least one tool advance additive, at least one soil enhancing slurry, at least one colloidal binding or impermeable material system, at least one impermeable soil amendment material system, at least one agricultural soil amendment material system, or a combination thereof.

9. The system of claim 8, wherein the at least one tool advance additive comprises an industrial foam, a polymer, an anti-claying agent, an anti-clogging agent, or a combination thereof.

10. The system of claim 1, wherein the soil mixing tool is attached to a carrier arm that is not a mast.

11. The system of claim 1, wherein the soil mixing tool is fully submersible in a column only as wide as a cutting width of the soil mixing tool.

12. The system of claim 1, wherein the conveyor presents the improved soil at a rate between about 50 yd$^3$/hr and about 200 y$^3$/hr.

13. The system of claim 1, wherein the conveyor removes and presents the conditioned soil, improved soil or a combination thereof at a rate between about 50 yd$^3$/hr and about 200 y$^3$/hr.

14. The system of claim 1, wherein the soil mixing tool further includes at least one nozzle configured to dispense a product.

15. The system of claim 14, wherein the product is an industrial foam, a polymer, an anti-claying agent, water, an anti-clogging agent, bentonite, cement, combined bentonite-cement slurries, phyllosilicates, granulated ground blast furnace slag, sphagnum, peat, wood chips, grass cuttings, straw, compost, manure, biosolids, sawdust, wood ash, vermiculite, perlite, tire chunks, lime, coal ash, pea gravel, sand, or a combination thereof.

16. The system of claim 1, wherein the conveyor moves the conditioned soil, improved soil or a combination thereof into the mobile mixing plant.

17. The system of claim 6, wherein the batching plant includes a silo, a storage tank, an agitation tank, a mixer, an agitator, or a combination thereof.

* * * * *